(12) United States Patent
Sridharan et al.

(10) Patent No.: US 11,899,413 B2
(45) Date of Patent: *Feb. 13, 2024

(54) BUILDING AUTOMATION SYSTEM WITH INTEGRATED BUILDING INFORMATION MODEL

(71) Applicant: Johnson Controls Technology Company, Auburn Hills, MI (US)

(72) Inventors: Ashok Sridharan, Tamil Nadu (IN); Jayesh Patil, Borivali West Mumbai (IN); Subrata Bhattacharya, Singapore (SG); Abhigyan Chatterjee, Asansol (IN)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,060

(22) Filed: Jul. 15, 2022

(65) Prior Publication Data

US 2022/0350296 A1    Nov. 3, 2022

Related U.S. Application Data

(63) Continuation of application No. 17/670,787, filed on Feb. 14, 2022, which is a continuation of application (Continued)

(51) Int. Cl.
*G05B 13/04* (2006.01)
*G05B 15/02* (2006.01)

(52) U.S. Cl.
CPC ............. *G05B 13/04* (2013.01); *G05B 15/02* (2013.01); *G05B 2219/25011* (2013.01); *G05B 2219/2642* (2013.01)

(58) Field of Classification Search
CPC ................... G05B 15/02; G05B 13/04; G05B 2219/25011
See application file for complete search history.

(56) References Cited

U.S. PATENT DOCUMENTS

| 5,301,109 A | 4/1994 | Landauer et al. |
| 5,446,677 A | 8/1995 | Jensen et al. |
| (Continued) | | |

FOREIGN PATENT DOCUMENTS

| AU | 2019226217 A1 | 11/2020 |
| AU | 2019226264 A1 | 11/2020 |
| (Continued) | | |

OTHER PUBLICATIONS

Balaji et al., "Brick: Metadata schema for portable smart building applications," Applied Energy, 2018 20 pages.
(Continued)

*Primary Examiner* — Aaron J Gray
(74) *Attorney, Agent, or Firm* — Foley & Lardner LLP

(57) ABSTRACT

A building automation system (BAS) includes building equipment located within a building and a BAS network configured to facilitate communications between the building equipment. The building equipment operate to affect a variable state or condition within the building. The BAS includes a BAS-BIM integrator configured to receive BAS points from the BAS network and to integrate the BAS points with a building information model (BIM). The BIM includes a plurality of BIM objects representing the building equipment. The BAS includes an integrated BAS-BIM viewer configured to use the BIM with the integrated BAS points to generate a user interface. The user interface includes a graphical representation of the BIM objects and the BAS points integrated therewith.

20 Claims, 18 Drawing Sheets

Related U.S. Application Data

No. 17/536,709, filed on Nov. 29, 2021, which is a continuation of application No. 16/723,803, filed on Dec. 20, 2019, now Pat. No. 11,307,543, which is a continuation of application No. 14/919,516, filed on Oct. 21, 2015, now Pat. No. 10,534,326.

(56) References Cited

U.S. PATENT DOCUMENTS

| | | | |
|---|---|---|---|
| 5,581,478 A | 12/1996 | Cruse et al. | |
| 5,812,962 A | 9/1998 | Kovac | |
| 5,960,381 A | 9/1999 | Singers et al. | |
| 5,973,662 A | 10/1999 | Singers et al. | |
| 6,014,612 A | 1/2000 | Larson et al. | |
| 6,031,547 A | 2/2000 | Kennedy | |
| 6,134,511 A | 10/2000 | Subbarao | |
| 6,157,943 A | 12/2000 | Meyer | |
| 6,285,966 B1 | 9/2001 | Brown et al. | |
| 6,363,422 B1 | 3/2002 | Hunter et al. | |
| 6,385,510 B1 | 5/2002 | Hoog et al. | |
| 6,389,331 B1 | 5/2002 | Jensen et al. | |
| 6,401,027 B1 | 6/2002 | Xu et al. | |
| 6,437,691 B1 | 8/2002 | Sandelman et al. | |
| 6,477,518 B1 | 11/2002 | Li et al. | |
| 6,487,457 B1 | 11/2002 | Hull et al. | |
| 6,493,755 B1 | 12/2002 | Hansen et al. | |
| 6,577,323 B1 | 6/2003 | Jamieson et al. | |
| 6,626,366 B2 | 9/2003 | Kayahara et al. | |
| 6,646,660 B1 | 11/2003 | Patty | |
| 6,704,016 B1 | 3/2004 | Oliver et al. | |
| 6,732,540 B2 | 5/2004 | Sugihara et al. | |
| 6,764,019 B1 | 7/2004 | Kayahara et al. | |
| 6,782,385 B2 | 8/2004 | Natsumeda et al. | |
| 6,813,532 B2 | 11/2004 | Eryurek et al. | |
| 6,816,811 B2 | 11/2004 | Seem | |
| 6,823,680 B2 | 11/2004 | Jayanth | |
| 6,826,454 B2 | 11/2004 | Sulfstede | |
| 6,865,511 B2 | 3/2005 | Frerichs et al. | |
| 6,925,338 B2 | 8/2005 | Eryurek et al. | |
| 6,986,138 B1 | 1/2006 | Sakaguchi et al. | |
| 7,031,880 B1 | 4/2006 | Seem et al. | |
| 7,401,057 B2 | 7/2008 | Eder | |
| 7,552,467 B2 | 6/2009 | Lindsay | |
| 7,627,544 B2 | 12/2009 | Chkodrov et al. | |
| 7,818,249 B2 | 10/2010 | Lovejoy et al. | |
| 7,889,051 B1 | 2/2011 | Billig et al. | |
| 7,996,488 B1 | 8/2011 | Casabella et al. | |
| 8,078,330 B2 | 12/2011 | Brickfield et al. | |
| 8,104,044 B1 | 1/2012 | Scofield et al. | |
| 8,229,470 B1 | 7/2012 | Ranjan et al. | |
| 8,401,991 B2 | 3/2013 | Wu et al. | |
| 8,495,745 B1 | 7/2013 | Schrecker et al. | |
| 8,516,016 B2 | 8/2013 | Park et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,635,182 B2 | 1/2014 | Mackay | |
| 8,682,921 B2 | 3/2014 | Park et al. | |
| 8,731,724 B2 | 5/2014 | Drees et al. | |
| 8,737,334 B2 | 5/2014 | Ahn et al. | |
| 8,738,334 B2 | 5/2014 | Jiang et al. | |
| 8,751,487 B2 | 6/2014 | Byrne et al. | |
| 8,788,097 B2 | 7/2014 | Drees et al. | |
| 8,805,995 B1 | 8/2014 | Oliver | |
| 8,843,238 B2 | 9/2014 | Wenzel et al. | |
| 8,874,071 B2 | 10/2014 | Sherman et al. | |
| 8,941,465 B2 | 1/2015 | Pineau et al. | |
| 8,990,127 B2 | 3/2015 | Taylor | |
| 9,070,113 B2 | 6/2015 | Shafiee et al. | |
| 9,116,978 B2 | 8/2015 | Park et al. | |
| 9,185,095 B1 | 11/2015 | Moritz et al. | |
| 9,189,527 B2 | 11/2015 | Park et al. | |
| 9,196,009 B2 | 11/2015 | Drees et al. | |
| 9,229,966 B2 | 1/2016 | Aymeloglu et al. | |
| 9,286,582 B2 | 3/2016 | Drees et al. | |
| 9,311,807 B2 | 4/2016 | Schultz et al. | |
| 9,344,751 B1 | 5/2016 | Ream et al. | |
| 9,354,968 B2 | 5/2016 | Wenzel et al. | |
| 9,447,985 B2 | 9/2016 | Johnson | |
| 9,507,686 B2 | 11/2016 | Horn et al. | |
| 9,524,594 B2 | 12/2016 | Ouyang et al. | |
| 9,558,196 B2 | 1/2017 | Johnston et al. | |
| 9,652,813 B2 | 5/2017 | Gifford et al. | |
| 9,753,455 B2 | 9/2017 | Drees | |
| 9,811,249 B2 | 11/2017 | Chen et al. | |
| 9,838,844 B2 | 12/2017 | Emeis et al. | |
| 9,886,478 B2 | 2/2018 | Mukherjee | |
| 9,948,359 B2 | 4/2018 | Horton | |
| 10,055,114 B2 | 8/2018 | Shah et al. | |
| 10,055,206 B2 | 8/2018 | Park et al. | |
| 10,116,461 B2 | 10/2018 | Fairweather et al. | |
| 10,169,454 B2 | 1/2019 | Ait-Mokhtar et al. | |
| 10,171,297 B2 | 1/2019 | Stewart et al. | |
| 10,171,586 B2 | 1/2019 | Shaashua et al. | |
| 10,187,258 B2 | 1/2019 | Nagesh et al. | |
| 10,514,963 B2 | 12/2019 | Shrivastava et al. | |
| 10,515,098 B2 | 12/2019 | Park et al. | |
| 10,534,326 B2 * | 1/2020 | Sridharan | G05B 13/04 |
| 10,536,295 B2 | 1/2020 | Fairweather et al. | |
| 10,564,993 B2 | 2/2020 | Deutsch et al. | |
| 10,705,492 B2 | 7/2020 | Harvey | |
| 10,708,078 B2 | 7/2020 | Harvey | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,845,771 B2 | 11/2020 | Harvey | |
| 10,854,194 B2 | 12/2020 | Park et al. | |
| 10,862,928 B1 | 12/2020 | Badawy et al. | |
| 10,871,756 B2 | 12/2020 | Johnson et al. | |
| 10,908,578 B2 | 2/2021 | Johnson et al. | |
| 10,921,760 B2 | 2/2021 | Harvey | |
| 10,921,768 B2 | 2/2021 | Johnson et al. | |
| 10,921,972 B2 | 2/2021 | Park et al. | |
| 10,969,133 B2 | 4/2021 | Harvey | |
| 10,986,121 B2 | 4/2021 | Stockdale et al. | |
| 11,016,998 B2 | 5/2021 | Park et al. | |
| 11,024,292 B2 | 6/2021 | Park et al. | |
| 11,038,709 B2 | 6/2021 | Park et al. | |
| 11,041,650 B2 | 6/2021 | Li et al. | |
| 11,054,796 B2 | 7/2021 | Holaso | |
| 11,070,390 B2 | 7/2021 | Park et al. | |
| 11,073,976 B2 | 7/2021 | Park et al. | |
| 11,108,587 B2 | 8/2021 | Park et al. | |
| 11,113,295 B2 | 9/2021 | Park et al. | |
| 11,156,978 B2 | 10/2021 | Johnson et al. | |
| 11,229,138 B1 | 1/2022 | Harvey et al. | |
| 11,314,726 B2 | 4/2022 | Park et al. | |
| 11,314,788 B2 | 4/2022 | Park et al. | |
| 11,353,831 B2 | 6/2022 | Sridharan et al. | |
| 11,556,105 B2 | 1/2023 | Cooley et al. | |
| 11,561,522 B2 | 1/2023 | Cooley et al. | |
| 11,561,523 B2 | 1/2023 | Cooley et al. | |
| 11,573,551 B2 | 2/2023 | Cooley et al. | |
| 11,586,167 B2 | 2/2023 | Cooley et al. | |
| 2002/0010562 A1 | 1/2002 | Schleiss et al. | |
| 2002/0016639 A1 | 2/2002 | Smith et al. | |
| 2002/0059229 A1 | 5/2002 | Natsumeda et al. | |
| 2002/0123864 A1 | 9/2002 | Eryurek et al. | |
| 2002/0147506 A1 | 10/2002 | Eryurek et al. | |
| 2002/0177909 A1 | 11/2002 | Fu et al. | |
| 2003/0005486 A1 | 1/2003 | Ridolfo et al. | |
| 2003/0014130 A1 | 1/2003 | Grumelart | |
| 2003/0073432 A1 | 4/2003 | Meade, II | |
| 2003/0158704 A1 | 8/2003 | Triginai et al. | |
| 2003/0171851 A1 | 9/2003 | Brickfield et al. | |
| 2003/0200059 A1 | 10/2003 | Ignatowski et al. | |
| 2004/0068390 A1 | 4/2004 | Saunders | |
| 2004/0128314 A1 | 7/2004 | Katibah et al. | |
| 2004/0133314 A1 | 7/2004 | Ehlers et al. | |
| 2004/0199360 A1 | 10/2004 | Friman et al. | |
| 2005/0055308 A1 | 3/2005 | Meyer et al. | |
| 2005/0108262 A1 | 5/2005 | Fawcett et al. | |
| 2005/0154494 A1 | 7/2005 | Ahmed | |
| 2005/0278703 A1 | 12/2005 | Lo et al. | |

(56) References Cited

U.S. PATENT DOCUMENTS

| | | |
|---|---|---|
| 2005/0283337 A1 | 12/2005 | Sayal |
| 2006/0010388 A1* | 1/2006 | Imhof .................... G06Q 10/10 715/734 |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1* | 2/2007 | Levin .................... G06Q 10/10 715/765 |
| 2007/0129645 A1 | 6/2007 | Hartley et al. |
| 2007/0203693 A1 | 8/2007 | Estes |
| 2007/0219645 A1* | 9/2007 | Thomas ................. G05B 15/02 700/29 |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0057425 A1 | 3/2009 | Sullivan et al. |
| 2009/0112532 A1 | 4/2009 | Foslien et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0107070 A1 | 4/2010 | Devineni et al. |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1* | 4/2011 | Ray ........................ G06Q 50/16 715/771 |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0083012 A1* | 4/2013 | Han .................... G05B 23/0272 345/419 |
| 2013/0086497 A1* | 4/2013 | Ambuhl ................. G05B 15/02 715/762 |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1* | 10/2013 | Reichard ............... G06F 3/0481 715/777 |
| 2013/0297050 A1* | 11/2013 | Reichard ............. G06F 16/2246 700/83 |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1* | 2/2014 | Mairs ...................... G09G 5/12 715/788 |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0088916 A1* | 3/2015 | Stokoe .................... H04L 67/10 715/733 |
| 2015/0105917 A1 | 4/2015 | Sasaki et al. |
| 2015/0113462 A1* | 4/2015 | Chen ...................... G05B 15/02 715/771 |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1* | 1/2016 | McFarland ............ G06F 3/0482 715/771 |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |

(56) References Cited

U.S. PATENT DOCUMENTS

| | | |
|---|---|---|
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0267759 A1 | 9/2016 | Kerzner |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CA | 2957726 A1 | 3/2016 |
| CA | 3043996 A1 | 2/2018 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |

(56) References Cited

FOREIGN PATENT DOCUMENTS

| | | |
|---|---|---|
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 186 687 A4 | 7/2017 |
| EP | 3 268 821 B1 | 1/2018 |
| EP | 3 324 306 A1 | 5/2018 |
| EP | 3 497 377 A1 | 6/2019 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al., "Brick: Towards a Unified Metadata Schema for Buildings," dated Nov. 16-17, 2016, 10 pages.

Balaji et al., Demo Abstract: Portable Queries Using the Brick Schema for Building Applications, dated Nov. 16-17, 2016, 2 pages.

Bhattacharya et al., Short Paper: Analyzing Metadata Schemas for Buildings—The Good, the Bad and the Ugly, ACM, dated Nov. 4-5, 2015, 4 pages.

Brick: Towards a Unified Metadata Schema for Buildings, dated Nov. 16, 2016, 46 pages.

Building Blocks for Smart Buildings, BrickSchema.org, dated Mar. 2019, 17 pages.

Fierro et al., Beyond a House of Sticks: Formalizing Metadata Tags with Brick, dated Nov. 13-14, 2019, 10 pages.

Fierro et al., Dataset: An Open Dataset and Collection Tool for BMS Point Labels, dated Nov. 10, 2019, 3 pages.

Fierro et al., Design and Analysis of a Query Processor for Brick, dated Jan. 2018, 25 pages.

Fierro et al., Design and Analysis of a Query Processor for Brick, dated Nov. 8-9, 2017, 10 pages.

Fierro et al., Mortar: An Open Testbed for Portable Building Analytics, dated Nov. 7-8, 2018, 10 pages.

Fierro et al., Why Brick is a Game Changer for Smart Buildings, URL: https://brickschema.org/papers/Brick_Memoori_Webinar_Presentation.pdf, Memoori Webinar, 2019, 67 pages.

Fierro, Writing Portable Building Analytics with the Brick Metadata Schema, UC Berkeley ACM E-Energy, 2019, 39 pages.

Gao et al., A large-scale evaluation of automated metadata inference approaches on sensors from air handling units, dated May 1, 2018, pp. 14-30.

Koh et al., "Scrabble: Transferrable Semi-Automated Semantic Metadata Normalization using Intermediate Representation," dated Nov. 7-8, 2018, 10 pages.

Koh et al., Plaster: An Integration, Benchmark, and Development Framework for Metadata Normalization Methods, dated Nov. 7-8, 2018, 10 pages.

Koh et al., Who can Access What, and When?, dated Nov. 13-14, 2019, 4 pages.

Metadata Schema for Buildings, URL: https://brickschema.org/docs/Brick-Leaflet.pdf, Retrieved from Internet Dec. 24, 2019, 3 pages.

U.S. Appl. No. 17/566,029, filed Unknown, Passivelogic, Inc.

U.S. Appl. No. 17/567,275, filed Unknown, Passivelogic, Inc.

U.S. Appl. No. 17/722,115, filed Unknown, Passivelogic, Inc.

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System—Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System—JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

(56) References Cited

OTHER PUBLICATIONS

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GGUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Balaji et al., "Brick: Metadata schema for portable smart building applications," Applied Energy, Sep. 15, 2018, 3 pages, (Abstract).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan, 18m 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-2-cv-00243 (documents filed Sep. 20, 2022-Jun. 29, 2022), and DDE-1-21-cv-01796 (documents filed Feb. 3, 2023-Jan.10, 2023 (480 pages total).
Digital Platform Litigation Documents Part 9, includes DDE-1-21-cv-01796 (documents filed Jan. 10, 2023- Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.

(56) References Cited

OTHER PUBLICATIONS

International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).

* cited by examiner

BUILDING AUTOMATION SYSTEM WITH INTEGRATED BUILDING INFORMATION MODEL

CROSS-REFERENCE TO RELATED PATENT APPLICATIONS

This application is a continuation of U.S. patent application Ser. No. 17/670,787 filed Feb. 14, 2022 which is a continuation of U.S. patent application Ser. No. 17/536,709 filed Nov. 29, 2021 which is a continuation of U.S. patent application Ser. No. 16/723,803 filed Dec. 20, 2019 which is a continuation of U.S. patent application Ser. No. 14/919,516 filed Oct. 21, 2015, the entireties of each of these patent applications are incorporated by reference in their entirety.

BACKGROUND

The present invention relates generally to a building automation system (BAS) and more particularly to a BAS configured to integrate BAS data with a building information model (BIM).

A BIM is a representation of the physical and/or functional characteristics of a building. A BIM may represent structural characteristics of the building (e.g., walls, floors, ceilings, doors, windows, etc.) as well as the systems or components contained within the building (e.g., lighting components, electrical systems, mechanical systems, HVAC components, furniture, plumbing systems or fixtures, etc.). In some embodiments, a BIM is a 3D graphical model of the building. A BIM may be created using computer modeling software or other computer-aided design (CAD) tools and may be used by any of a plurality of entities that provide building-related services.

A BAS is, in general, a system of devices configured to control, monitor, and/or manage equipment in or around a building or building area. A BAS can include, for example, a HVAC system, a security system, a lighting system, a fire alerting system, any other system that is capable of managing building functions or devices, or any combination thereof. Some BASs provide graphical user interfaces that allow a user to interact with components of the BAS. Generating graphics for the graphical user interfaces can be time consuming and often results in low quality graphics that do not adequately represent the building equipment. It would be desirable to use the graphics and modeling provided by a BIM as part of the BAS interface. However, it can be difficult and challenging to integrate BAS points with a BIM.

SUMMARY

One implementation of the present disclosure is a building automation system (BAS). The BAS includes building equipment located within a building and a BAS network configured to facilitate communications between the building equipment. The building equipment operate to affect a variable state or condition within the building. The BAS includes a BAS-BIM integrator configured to receive BAS points from the BAS network and to integrate the BAS points with a building information model (BIM). The BIM includes a plurality of BIM objects representing the building equipment. The BAS includes an integrated BAS-BIM viewer configured to use the BIM with the integrated BAS points to generate a user interface. The user interface includes a graphical representation of the BIM objects and the BAS points integrated therewith.

In some embodiments, the BIM includes a three-dimensional model of the building. The BIM objects may include one or more objects representing structural components of the building and one or more objects representing spaces within the building.

In some embodiments, the integrated BAS-BIM viewer uses the integrated BAS points to retrieve corresponding point values from the BAS network and displays the point values as part of the user interface. The point values may include at least one of values measured by the building equipment, values generated by the building equipment, setpoints for the building equipment, and operating parameters for the building equipment.

In some embodiments, the integrated BAS-BIM viewer generates a graph including a history of values for at least one of the BAS points and displays the graph as part of the user interface.

In some embodiments, the BAS-BIM integrator includes a BAS tree generator configured to generate a BAS tree comprising the BAS points, a BIM tree generator configured to generate a BIM tree comprising the BIM objects, and a mapping interface generator configured to generate a mapping interface comprising the BAS tree and the BIM tree. The BAS-BIM integrator may be configured to establish mappings between the BAS points and the BIM objects based on a user input received via the mapping interface. In some embodiments, the user input includes dragging and dropping the BAS points from the BAS tree onto BIM objects in the BIM tree.

In some embodiments, the BAS-BIM integrator stores mappings between the BAS points and the BIM objects in a mappings database. The integrated BAS-BIM viewer may retrieve the mappings from the mappings database and use the mappings to generate the user interface.

In some embodiments, the integrated BAS-BIM viewer receives a control action via the user interface and uses the control action to generate a control signal for the building equipment.

Another implementation of the present disclosure is a system for integrating building automation system (BAS) points with a building information model (BIM). The system includes a BAS-BIM integrator configured to receive BAS points from a BAS network and to integrate the BAS points with a BIM. The BIM includes a plurality of BIM objects representing building equipment. The system includes an integrated BAS-BIM viewer configured to use the BIM with the integrated BAS points to generate a user interface. The user interface includes a graphical representation of the BIM objects and the BAS points integrated therewith.

In some embodiments, the BIM includes a three-dimensional model of the building. The BIM objects may include one or more objects representing structural components of the building and one or more objects representing spaces within the building.

In some embodiments, the integrated BAS-BIM viewer uses the integrated BAS points to retrieve corresponding point values from the BAS network and displays the point values as part of the user interface. The point values may include at least one of values measured by the building equipment, values generated by the building equipment, setpoints for the building equipment, and operating parameters for the building equipment.

In some embodiments, the integrated BAS-BIM viewer generates a graph including a history of values for at least one of the BAS points and displays the graph as part of the user interface.

In some embodiments, the BAS-BIM integrator includes a BAS tree generator configured to generate a BAS tree comprising the BAS points, a BIM tree generator configured to generate a BIM tree comprising the BIM objects, and a mapping interface generator configured to generate a mapping interface comprising the BAS tree and the BIM tree. The BAS-BIM integrator may be configured to establish mappings between the BAS points and the BIM objects based on a user input received via the mapping interface. In some embodiments, the user input includes dragging and dropping the BAS points from the BAS tree onto BIM objects in the BIM tree.

In some embodiments, the BAS-BIM integrator stores mappings between the BAS points and the BIM objects in a mappings database. The integrated BAS-BIM viewer may retrieve the mappings from the mappings database and use the mappings to generate the user interface.

In some embodiments, the integrated BAS-BIM viewer receives a control action via the user interface and uses the control action to generate a control signal for the building equipment.

Another implementation of the present disclosure is a method for integrating building automation system (BAS) points with a building information model (BIM). The method includes receiving a BIM including a plurality of BIM objects representing building equipment, collecting BAS points from a BAS network, integrating the BAS points with the BIM, and using the BIM with the integrated BAS points to generate a user interface. The user interface includes a graphical representation of the BIM objects and the BAS points integrated therewith. The method includes detecting a control action received via the user interface and using the control action to generate a control signal for the building equipment in response to detecting the control action.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
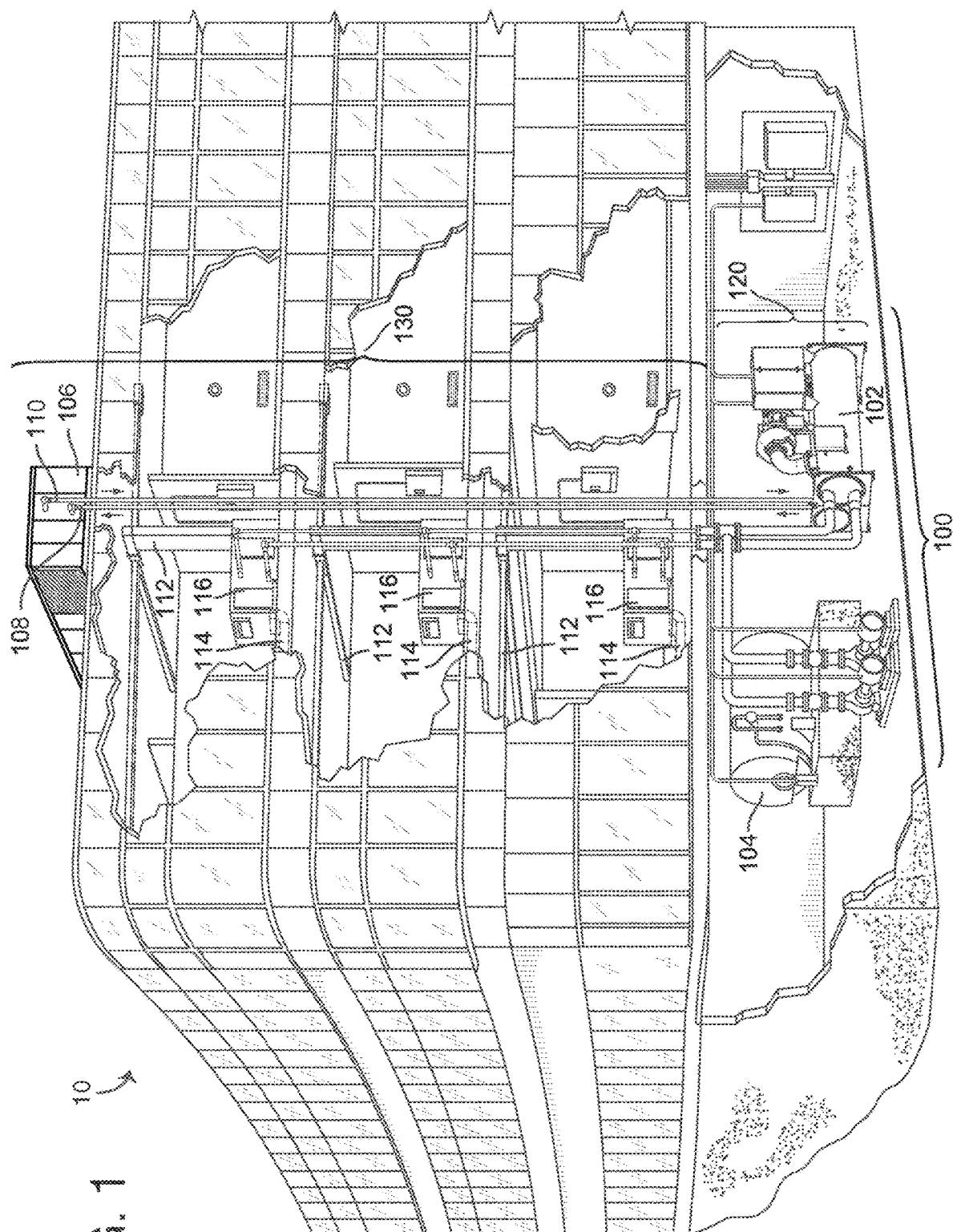
FIG. 1 is a drawing of a building equipped with a building automation system (BAS), according to an exemplary embodiment.

Referring generally to the FIGURES, a building automation system (BAS) with an integrated building information model (BIM) is shown, according to an exemplary embodiment. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

A BIM is a representation of the physical and/or functional characteristics of a building. A BIM may represent structural characteristics of the building (e.g., walls, floors, ceilings, doors, windows, etc.) as well as the systems or components contained within the building (e.g., lighting components, electrical systems, mechanical systems, HVAC components, furniture, plumbing systems or fixtures, etc.). In some embodiments, a BIM is a 3D graphical model of the building. A BIM may be created using computer modeling software or other computer-aided design (CAD) tools and may be used by any of a plurality of entities that provide building-related services.

In some embodiments, a BIM represents building components as objects (e.g., software objects). For example, a BIM may include a plurality of objects that represent physical components within the building as well as building spaces. Each object may include a collection of attributes that define the physical geometry of the object, the type of object, and/or other properties of the object. For example, objects representing building spaces may define the size and location of the building space. Objects representing physical components may define the geometry of the physical component, the type of component (e.g., lighting fixture, air handling unit, wall, etc.), the location of the physical component, a material from which the physical component is constructed, and/or other attributes of the physical component.

The systems and methods described herein may be used to integrate BAS data with a BIM. Advantageously, the integration provided by the present invention allows dynamic BAS data (e.g., data points and their associated values) to be combined with the BIM. The integrated BIM with BAS data can be viewed using an integrated BAS-BIM viewer (e.g., CAD software, a CAD viewer, a web browser, etc.). The BAS-BIM viewer uses the geometric and location information from the BIM to generate 3D representations of physical components and building spaces.

In some embodiments, the BAS-BIM viewer functions as a user interface for monitoring and controlling the various systems and devices represented in the integrated BIM. For example, a user can view real-time data from the BAS and/or trend data for objects represented in the BIM simply by viewing the BIM with integrated BAS data. The user can view BAS points, change the values of BAS points (e.g., setpoints), configure the BAS, and interact with the BAS via the BAS-BIM viewer. These features allow the BIM with integrated BAS data to be used as a building control interface which provides a graphical 3D representation of the building and the equipment contained therein without requiring a user to manually create or define graphics for various building components. Additional features and advantages of the present invention are described in greater detail below.

Building Automation System and HVAC System

Referring now to FIGS. 1-4, an exemplary building automation system (BAS) and HVAC system in which the systems and methods of the present invention may be implemented are shown, according to an exemplary embodiment. Referring particularly to FIG. 1, a perspective view of a building 10 is shown. Building 10 is served by a BAS which includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
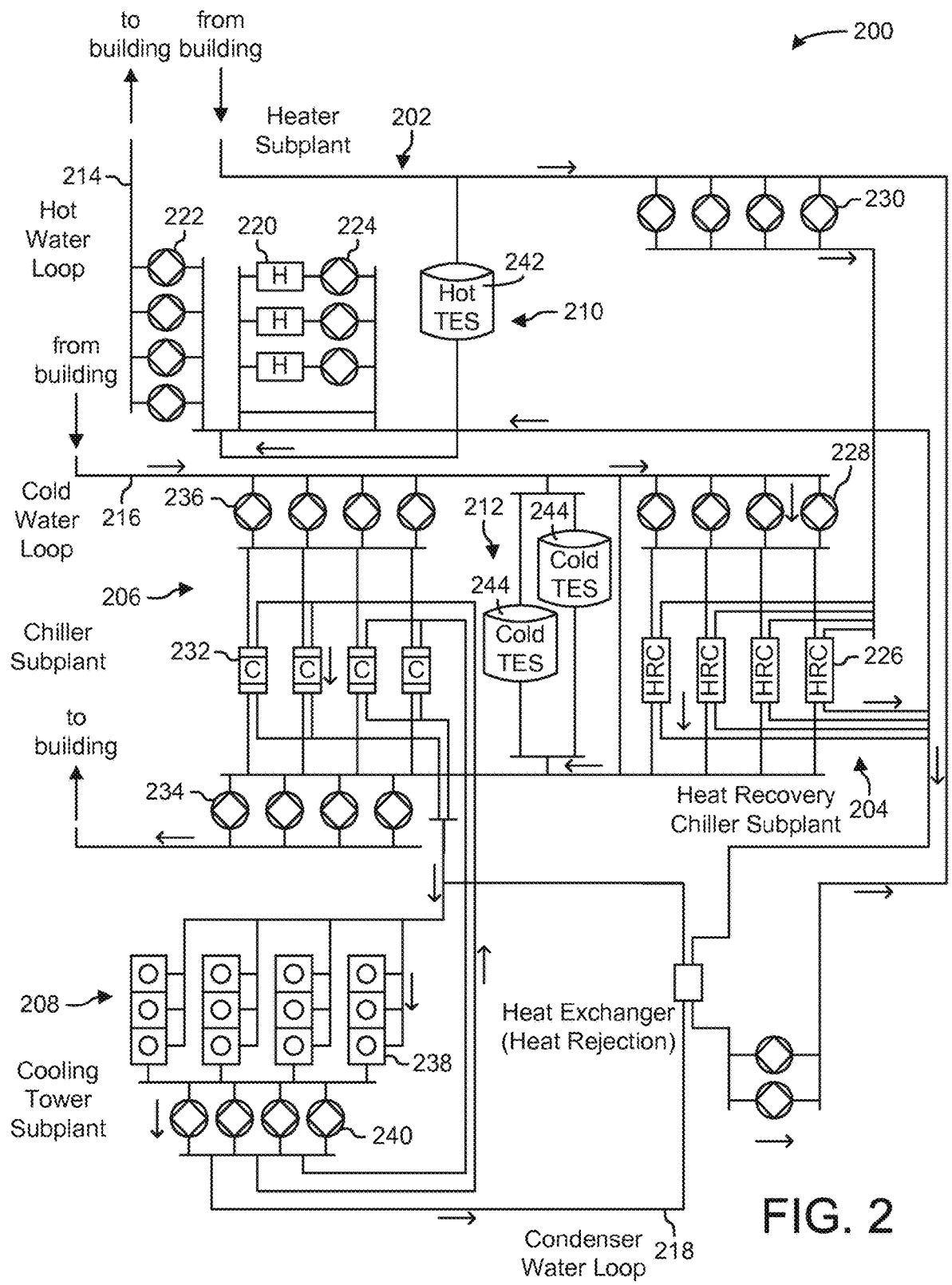
FIG. 2 is a block diagram of a waterside system which may be used to provide heating and/or cooling to the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
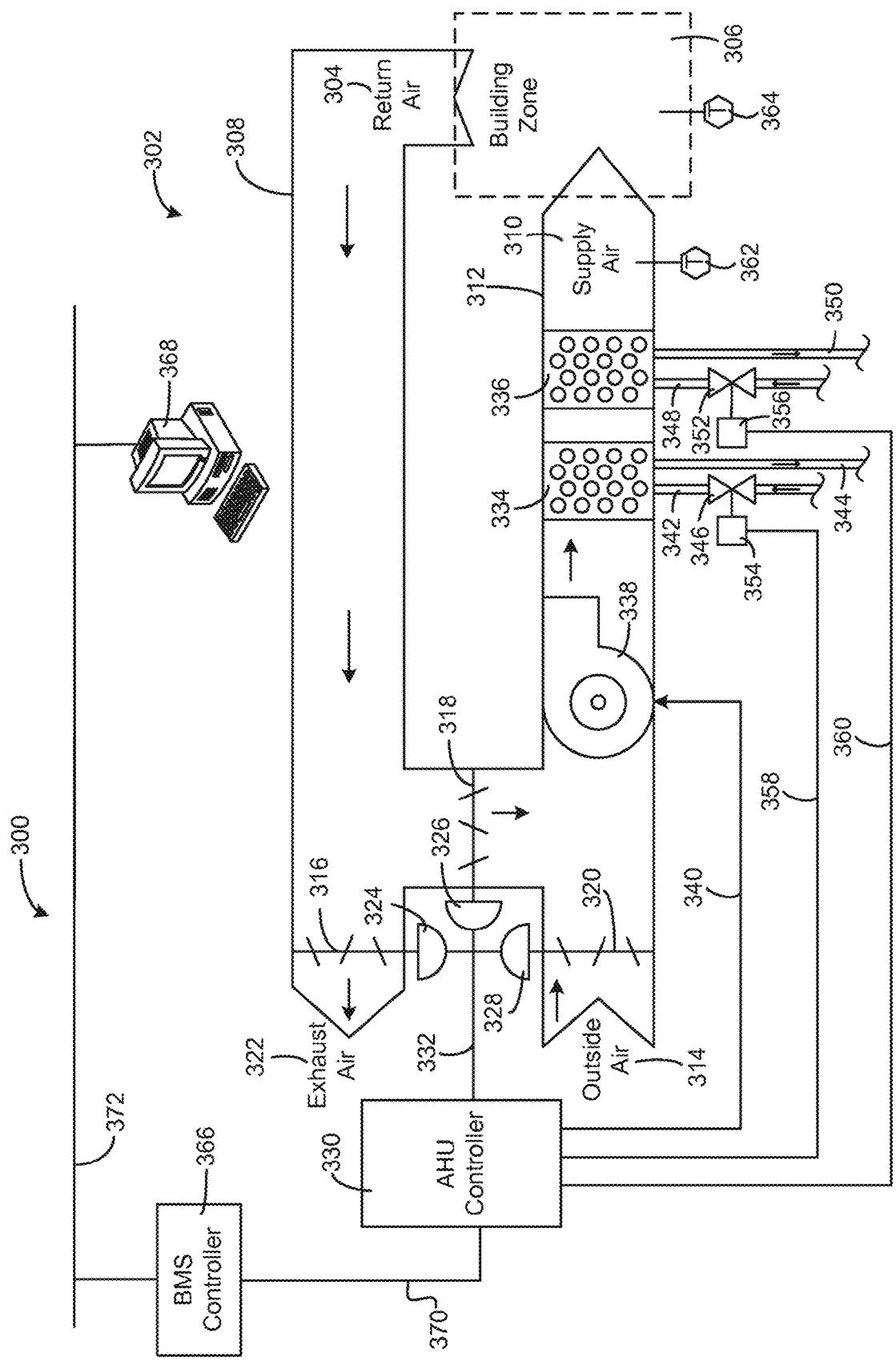
FIG. 3 is a block diagram of an airside system which may be used to provide heating and/or cooling to the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 may be separate (as shown in FIG. 3) or integrated. In an integrated implementation, AHU controller 330 may be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 may provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BAS controller 366 and/or AHU controller 330 via communications link 372.

Figure 4:
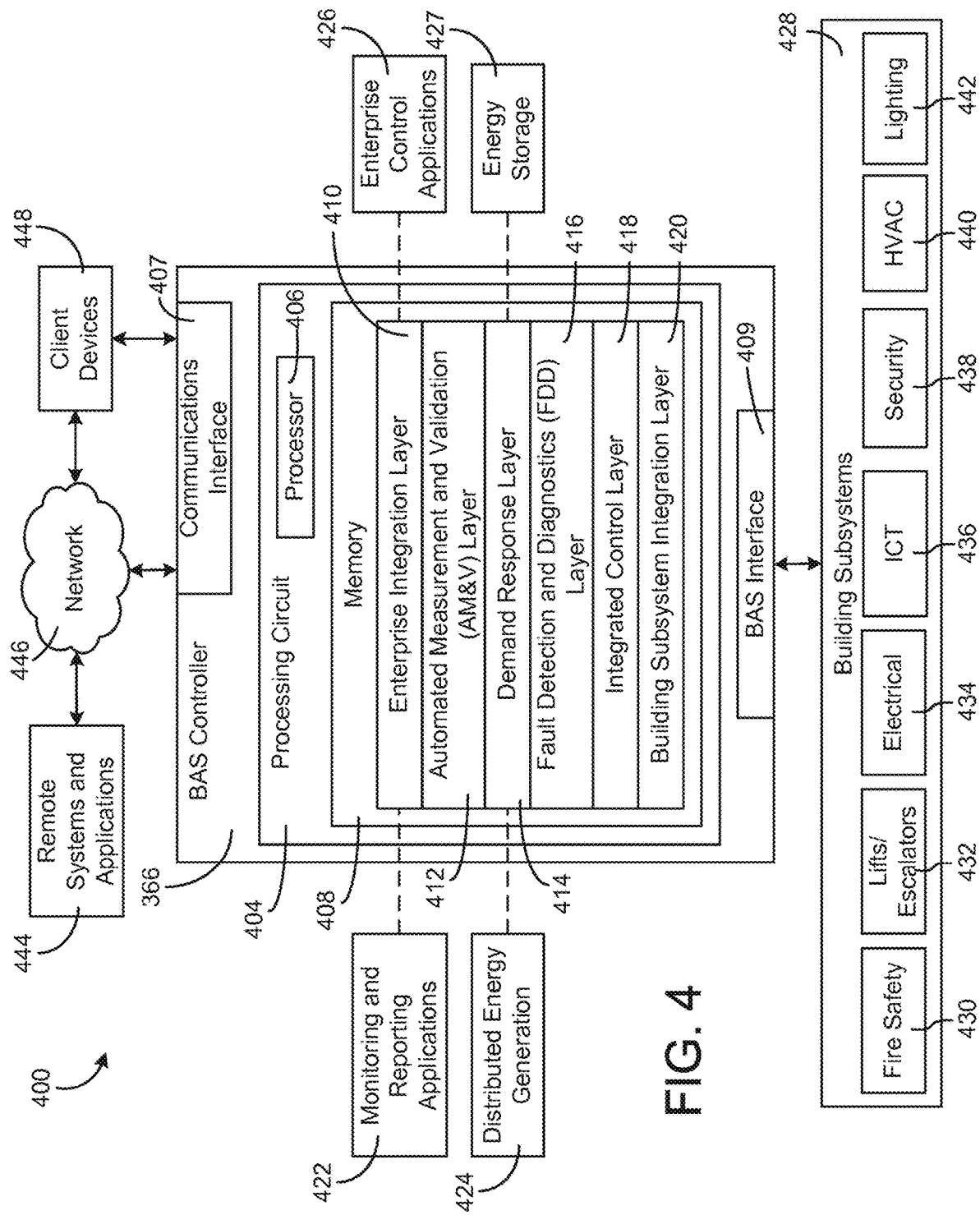
FIG. 4 is a block diagram of a BAS which may be used to monitor and control building equipment in the building of FIG. 1, according to an exemplary embodiment.

Referring now to FIG. 4, a block diagram of a building automation system (BAS) 400 is shown, according to an exemplary embodiment. BAS 400 may be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 may facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 may also facilitate communications between BAS controller 366 and client devices 448. BAS interface 409 may facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 may be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 may be distributed across multiple servers or computers (e.g., that can exist in distributed locations). Further, while FIG. 4 shows applications 422 and 426 as existing outside of BAS controller 366, in some embodiments, applications 422 and 426 may be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 may be configured to manage communications between BAS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BAS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BAS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BAS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

BAS-BIM Integration

Figure 5:
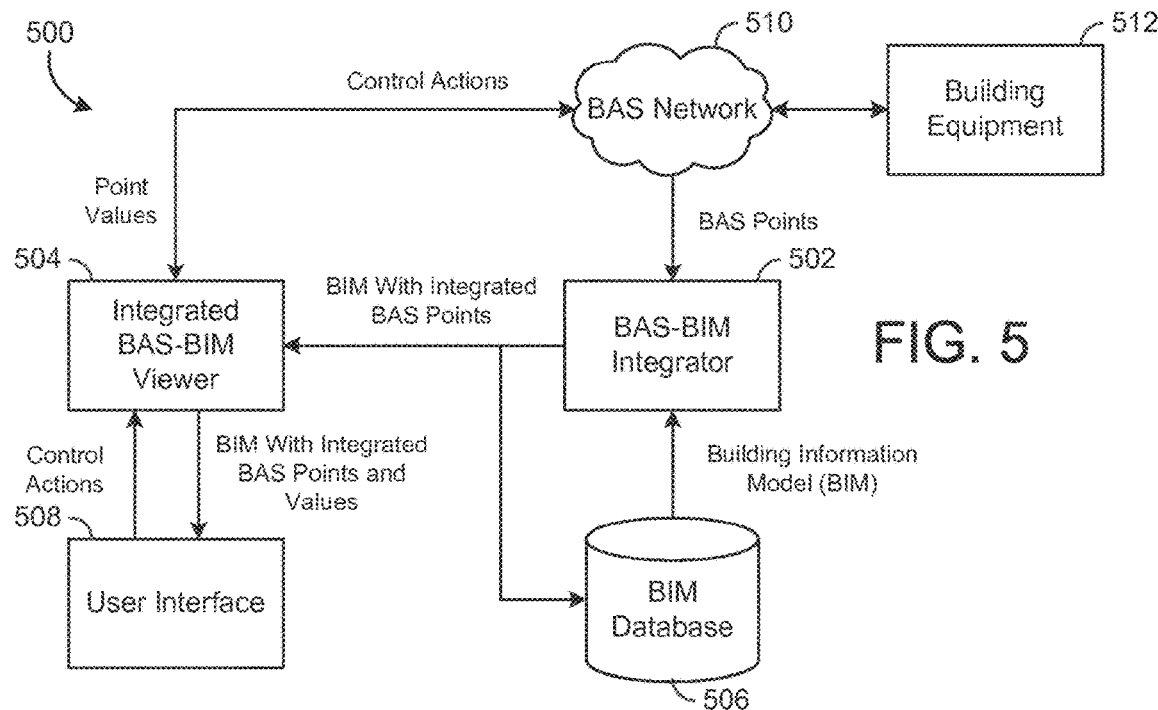
FIG. 5 is a block diagram of a system for integrating BAS data with a building information model (BIM), according to an exemplary embodiment.

Referring now to FIG. 5, a system 500 for integrating building automation system data with a building information model is shown, according to an exemplary embodiment. A building information model (BIM) is a representation of the physical and/or functional characteristics of a building. A BIM may represent structural characteristics of the building (e.g., walls, floors, ceilings, doors, windows, etc.) as well as the systems or components contained within the building (e.g., lighting components, electrical systems, mechanical systems, HVAC components, furniture, plumbing systems or fixtures, etc.).

In some embodiments, a BIM is a 3D graphical model of the building. A BIM may be created using computer modeling software or other computer-aided design (CAD) tools and may be used by any of a plurality of entities that provide building-related services. For example, a BIM may be used by architects, contractors, landscape architects, surveyors, civil engineers, structural engineers, building services engineers, building owners/operators, or any other entity to obtain information about the building and/or the components contained therein. A BIM may replace 2D technical drawings (e.g., plans, elevations, sections, etc.) and may provide significantly more information than traditional 2D drawings. For example, a BIM may include spatial relationships, light analyses, geographic information, and/or qualities or properties of building components (e.g., manufacturer details).

In some embodiments, a BIM represents building components as objects (e.g., software objects). For example, a BIM may include a plurality of objects that represent physical components within the building as well as building spaces. Each object may include a collection of attributes that define the physical geometry of the object, the type of object, and/or other properties of the object. For example, objects representing building spaces may define the size and location of the building space. Objects representing physical components may define the geometry of the physical component, the type of component (e.g., lighting fixture, air handling unit, wall, etc.), the location of the physical component, a material from which the physical component is constructed, and/or other attributes of the physical component.

In some embodiments, a BIM includes an industry foundation class (IFC) data model that describes building and construction industry data. An IFC data model is an object-based file format that facilitates interoperability in the architecture, engineering, and construction industry. An IFC model may store and represent building components in terms of a data schema. An IFC model may include multiple layers and may include object definitions (e.g., IfcObjectDefinition), relationships (e.g., IfcRelationship), and property definitions (e.g., IfcPropertyDefinition). Object definitions may identify various objects in the IFC model and may include information such as physical placement, controls, and groupings. Relationships may capture relationships between objects such as composition, assignment, connectivity, association, and definition. Property definitions may capture dynamically extensible properties about objects. Any type of property may be defined as an enumeration, a list of values, a table of values, or a data structure.

A BIM can be viewed and manipulated using a 3D modeling program (e.g., CAD software), a model viewer, a web browser, and/or any other software capable of interpreting and rendering the information contained within the BIM. Appropriate viewing software may allow a user to view the representation of the building from any of a variety of perspectives and/or locations. For example, a user can view the BIM from a perspective within the building to see how the building would look from that location. In other words, a user can simulate the perspective of a person within the building.

Advantageously, the integration provided by system 500 allows dynamic BAS data (e.g., data points and their associated values) to be combined with the BIM. The integrated BIM with BAS data can be viewed using an integrated BAS-BIM viewer (e.g., CAD software, a CAD viewer, a web browser, etc.). The BAS-BIM viewer uses the geometric and location information from the BIM to generate 3D representations of physical components and building spaces. In some embodiments, the BAS-BIM viewer functions as a user interface for monitoring and controlling the various systems and devices represented in the integrated BIM. For example, a user can view real-time data from the BAS and/or trend data for objects represented in the BIM simply by viewing the BIM with integrated BAS data. The user can view BAS points, change the values of BAS points (e.g., setpoints), configure the BAS, and interact with the BAS via the BAS-BIM viewer. These features allow the BIM with integrated BAS data to be used as a building control interface which provides a graphical 3D representation of the building and the equipment contained therein without requiring a user to manually create or define graphics for various building components.

Still referring to FIG. 5, system 500 is shown to include a BAS-BIM integrator 502, an integrated BAS-BIM viewer 504, a BIM database 506, a user interface 508, a BAS network 510, and building equipment 512. In some embodiments, some or all of the components of system 500 are part of BAS 400. For example, BAS network 510 may be a building automation and control network (e.g., a BACnet network, a LonWorks network, etc.) used by BAS 400 to communicate with building equipment 512. Building equipment 512 may include any of the equipment described with reference to FIGS. 1-4. For example, building equipment 512 may include HVAC equipment (e.g., chillers, boilers, air handling units pumps, fans, valves, dampers, etc.), fire safety equipment, lifts/escalators, electrical equipment, communications equipment, security equipment, lighting equipment, or any other type of equipment which may be contained within a building.

In some embodiments, BAS-BIM integrator 502, integrated BAS-BIM viewer 504, BIM database 506, and user interface 508 are components of BAS controller 366. In other embodiments, one or more of components 502-508 may be components of a user device. For example, integrated BAS-BIM viewer 504 may be an application running on the user device and may be configured to present a BIM with integrated BAS points via a user interface (e.g., user interface 508) of the user device. BAS-BIM integrator 502 may be part of the same application and may be configured to integrate BAS points with a BIM model based on user input provided via user interface 508. In further embodiments, integrated BAS-BIM viewer 504 is part of a user device that receives a BIM with integrated BAS points from a remote BAS-BIM integrator 502. It is contemplated that components 502-508 may be part of the same system/device (e.g., BAS controller 366, a user device, etc.) or may be distributed across multiple systems/devices. All such embodiments are within the scope of the present disclosure.

Still referring to FIG. 5, BAS-BIM integrator 502 is shown receiving a BIM and BAS points. In some embodiments, BAS-BIM integrator 502 receives a BIM from BIM database 506. In other embodiments, the BIM is uploaded by a user or retrieved from another data source. BAS-BIM integrator 502 may receive BAS points from BAS network 510 (e.g., a BACnet network, a LonWorks network, etc.). The BAS points may be measured data points, calculated data points, setpoints, or other types of data points used by the BAS, generated by the BAS, or stored within the BAS (e.g., configuration settings, control parameters, equipment information, alarm information, etc.).

BAS-BIM integrator 502 may be configured to integrate the BAS points with the BIM. In some embodiments, BAS-BIM integrator 502 integrates the BAS points with the BIM based on a user-defined mapping. For example, BAS-BIM integrator 502 may be configured to generate a mapping interface presents the BAS points as a BAS tree and presents the BIM objects as a BIM tree. The BAS tree and the BIM tree may be presented to a user via user interface 508. The mapping interface may allow a user to drag and drop BAS points onto objects of the BIM or otherwise define associations between BAS points and BIM objects. An exemplary mapping interface is described in greater detail with reference to FIG. 18. In other embodiments, BAS-BIM integrator 502 automatically maps the BAS points to BIM objects based on attributes of the BAS points and the BIM objects (e.g., name, attributes, type, etc.).

In some embodiments, BAS-BIM integrator 502 updates or modifies the BIM to include the BAS points. For example, BAS-BIM integrator 502 may store the BAS points as properties or attributes of objects within the BIM (e.g., objects representing building equipment or spaces). The modified BIM with integrated BAS points may be provided to integrated BAS-BIM viewer 504 and/or stored in BIM database 506. When the BIM is viewed, the BAS points can be viewed along with the other attributes of the BIM objects. In other embodiments, BAS-BIM integrator 502 generates a mapping between BIM objects and BAS points without modifying the BIM. The mapping may be stored in a separate database or included within the BIM. When the BIM is viewed, integrated BAS-BIM viewer 504 may use the mapping to identify BAS points associated with BIM objects.

Integrated BAS-BIM viewer 504 is shown receiving the BIM with integrated BAS points from BAS-BIM integrator 502. Integrated BAS-BIM viewer 504 may generate a 3D graphical representation of the building and the components contained therein, according to the attributes of objects defined by the BIM. As previously described, the BIM objects may be modified to include BAS points. For example, some or all of the objects within the BIM may be modified to include an attribute identifying a particular BAS point (e.g., a point name, a point ID, etc.). When integrated BAS-BIM viewer 504 renders the BIM with integrated BAS points, integrated BAS-BIM viewer 504 may use the identities of the BAS points provided by the BIM to retrieve corresponding point values from BAS network 510. Integrated BAS-BIM viewer 504 may incorporate the BAS point values within the BIM to generate a BIM with integrated BAS points and values.

Integrated BAS-BIM viewer 504 is shown providing the BIM with integrated BAS points and values to user interface 508. User interface 508 may present the BIM with integrated BAS points and values to a user. Advantageously, the BIM with integrated BAS points and values may include real-time data from BAS network 510, as defined by the integrated BAS points. A user can monitor the BAS and view present values of the BAS points from within the BIM. In some embodiments, the BIM with integrated BAS points and values includes trend data for various BAS points. User interface 508 may display the trend data to a user along with the BIM.

In some embodiments, integrated BAS-BIM viewer 504 receives control actions via user interface 508. For example, a user can write new values for any of the BAS points displayed in the BIM (e.g., setpoints), send operating commands or control signals to the building equipment displayed in the BIM, or otherwise interact with the BAS via the BIM. Control actions submitted via user interface 508 may be received at integrated BAS-BIM viewer 504 and provided to BAS network 510. BAS network 510 may use the control actions to generate control signals for building equipment 512 or otherwise adjust the operation of building equipment 512. In this way, the BIM with integrated BAS points and values not only allows a user to monitor the BAS, but also provides the control functionality of a graphical BAS management and control interface. Several examples of the control interface provided by the BIM with integrated BAS points and values are described in greater detail with reference to FIGS. 9-18.

Figure 6:
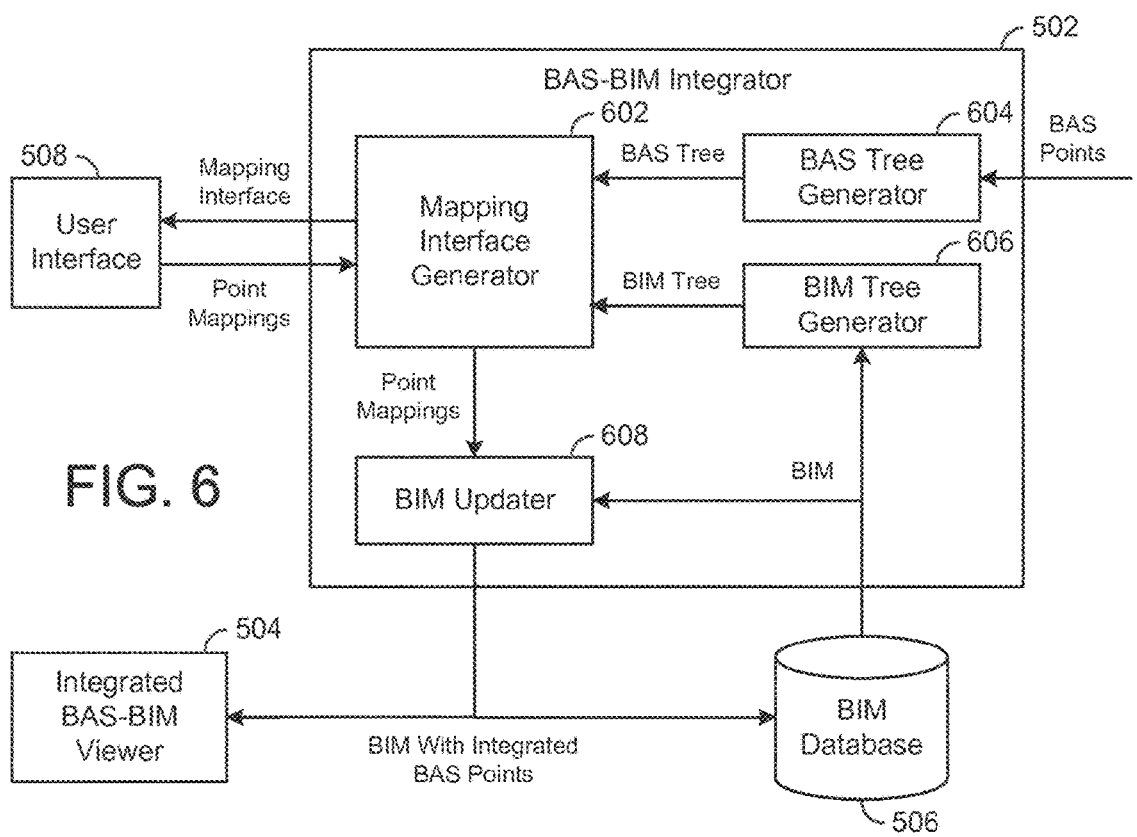
FIG. 6 is a block diagram illustrating the BAS-BIM integrator of FIG. 5 in greater detail, according to an exemplary embodiment.
Figure 18:
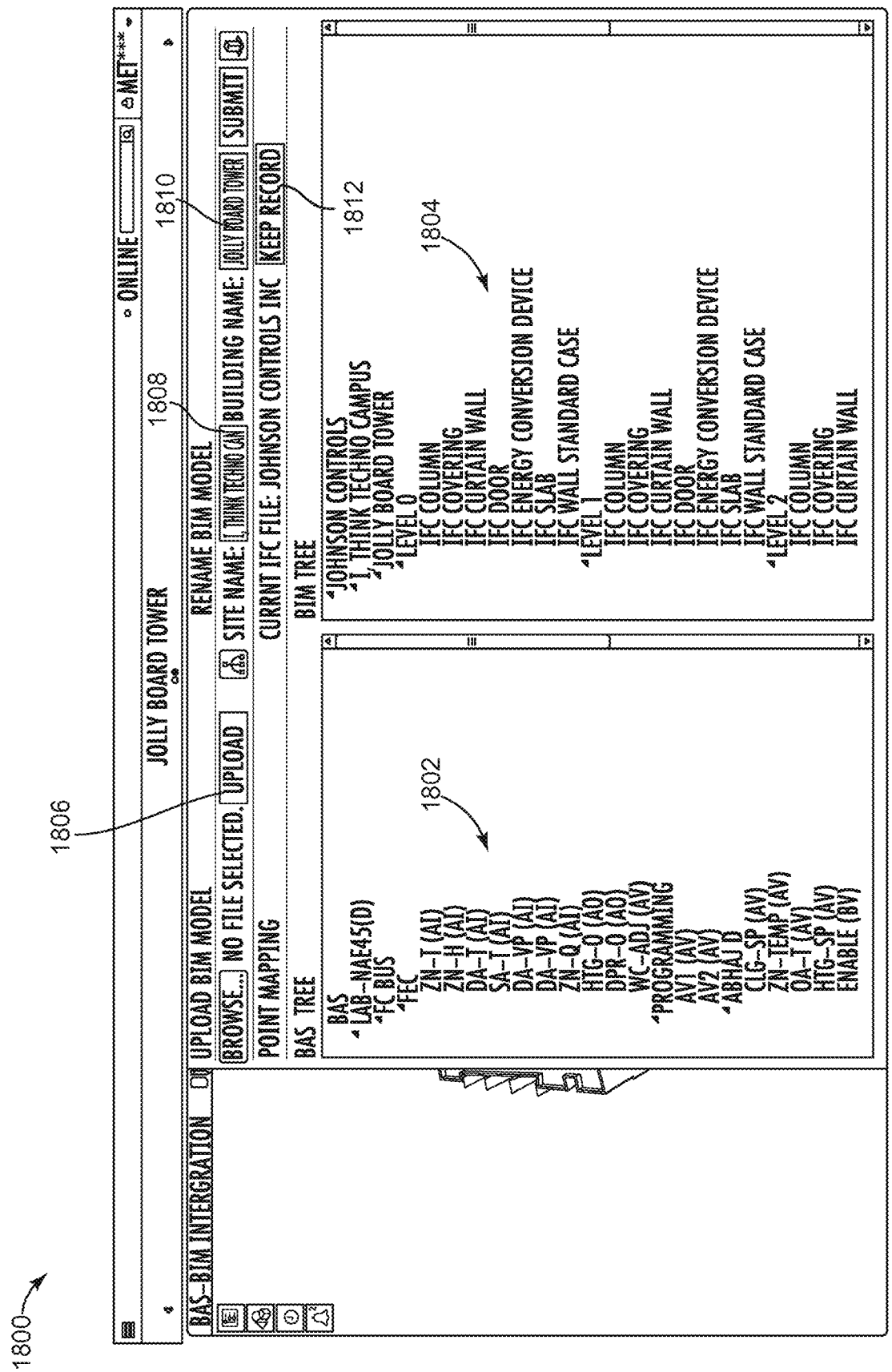

Referring now to FIG. 6, a block diagram illustrating BAS-BIM integrator 502 in greater detail is shown, according to an exemplary embodiment. BAS-BIM integrator 502 is shown to include a BIM tree generator 606 and a BAS tree generator 604. BIM tree generator 606 may be configured to receive a BIM from BIM database 506. Alternatively, the BIM may be uploaded by a user or retrieved from another location. BIM tree generator 606 may generate a BIM tree based on the BIM. The BIM tree may include a hierarchical listing of BIM objects referenced in the BIM. BAS tree generator 604 may receive BAS points from the BAS and may generate a BAS tree based on the BAS points. The BAS tree may include a hierarchical listing of BAS points. Exemplary BAS and BIM trees are shown in FIG. 18.

BAS-BIM integrator 502 is shown to include a mapping interface generator 602. Mapping interface generator 602 may be configured to generate an interface for mapping BAS points to BIM objects. In some embodiments, the mapping interface includes the BAS tree and BIM tree. For example, the BAS tree may be displayed in a first portion of the mapping interface and the BIM tree may be displayed in a second portion of the mapping interface. The mapping interface may be presented to a user via user interface 508. A user can define point mappings by dragging and dropping BAS points from the BAS tree onto BIM objects in the BIM tree. Mapping interface generator 602 may receive the point mappings from user interface 508 and may provide the point mappings to BIM updater 608. An exemplary mapping interface which may be generated by mapping interface generator 602 is shown in FIG. 18.

BIM updater 608 may be configured to update or modify the BIM based on the BAS point mappings. For example, BIM updater 608 may store the BAS points as properties or attributes of objects within the BIM (e.g., objects representing building equipment or spaces). The modified BIM with integrated BAS points may be provided to integrated BAS-BIM viewer 504 and/or stored in BIM database 506. When the BIM is viewed, the BAS points mapped to a BIM object can be viewed along with other attributes of the BIM objects.

Figure 7:
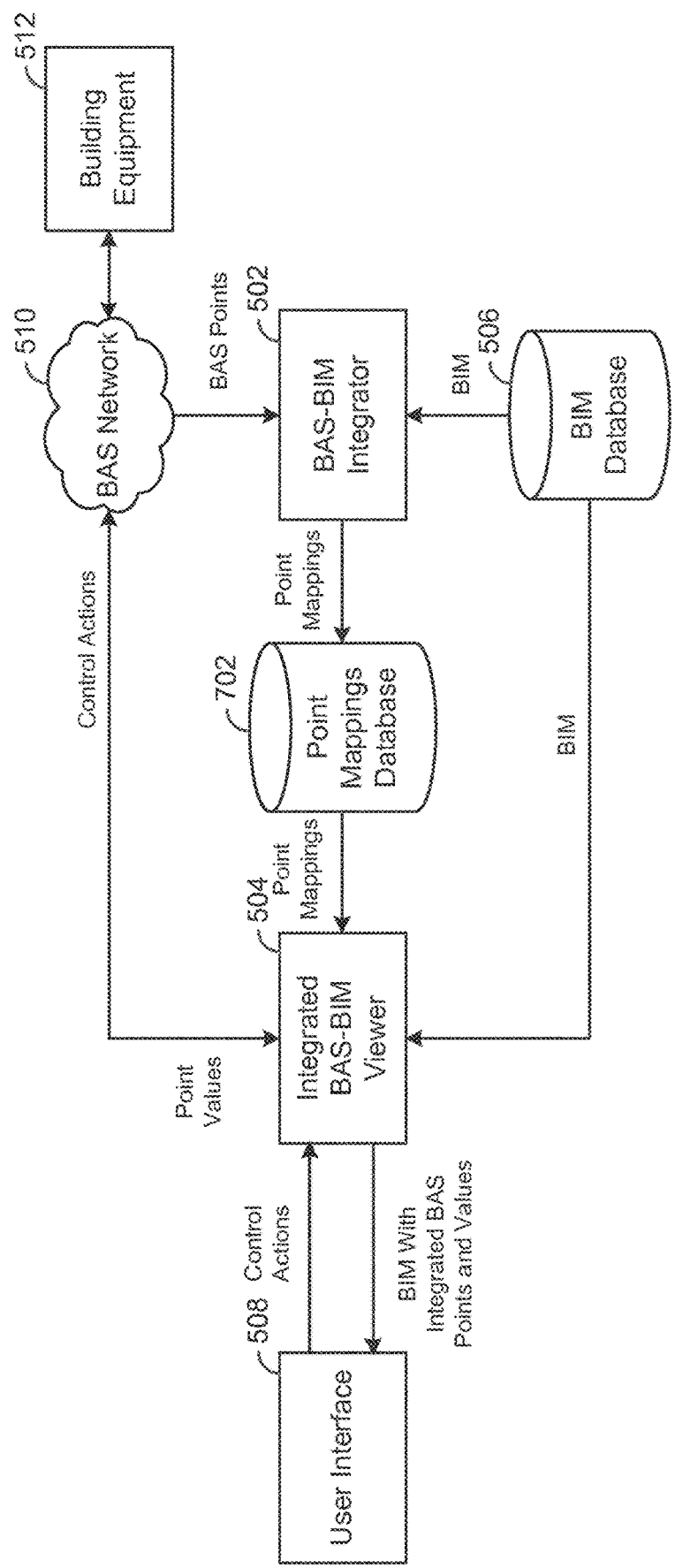
FIG. 7 is a block diagram of another system for integrating BAS data with a BIM, according to an exemplary embodiment.

Referring now to FIG. 7, another system 700 for integrating building automation system data with a building information model is shown, according to an exemplary embodiment. System 700 is shown to include many of the same components as system 500. For example, system 700 is shown to include a BAS-BIM integrator 502, an integrated BAS-BIM viewer 504, a BIM database 506, a user interface 508, a BAS network 510, and building equipment 512. These components may be the same or similar as previously described with reference to FIGS. 5-6.

System 700 is also shown to include a point mappings database 702. In the embodiment shown in FIG. 7, BAS-BIM integrator 502 does not modify the BIM to include the BAS points, but rather stores the point mappings in point mappings database 702. When the BIM is viewed, integrated BAS-BIM viewer 504 may retrieve the BIM from BIM database 506 and may retrieve the point mappings from point mappings database 702. Integrated BAS-BIM viewer 504 may use the point mappings to identify BAS points associated with the BIM objects.

Integrated BAS-BIM viewer 504 may generate a 3D graphical representation of the building and the components contained therein, according to the attributes of objects defined by the BIM. When integrated BAS-BIM viewer 504 renders the BIM, integrated BAS-BIM viewer 504 may use the identities of the BAS points provided by the point mappings to retrieve corresponding point values from BAS network 510. Integrated BAS-BIM viewer 504 may incorporate the BAS point values within the BIM to generate a BIM with integrated BAS points and values.

Integrated BAS-BIM viewer 504 is shown providing the BIM with integrated BAS points and values to user interface 508. User interface 508 may present the BIM with integrated BAS points and values to a user. Advantageously, the BIM with integrated BAS points and values may include real-time data from BAS network 510, as defined by the integrated BAS points. A user can monitor the BAS and view present values of the BAS points from within the BIM. In some embodiments, the BIM with integrated BAS points and values includes trend data for various BAS points. User interface 508 may display the trend data to a user along with the BIM.

Figure 8:
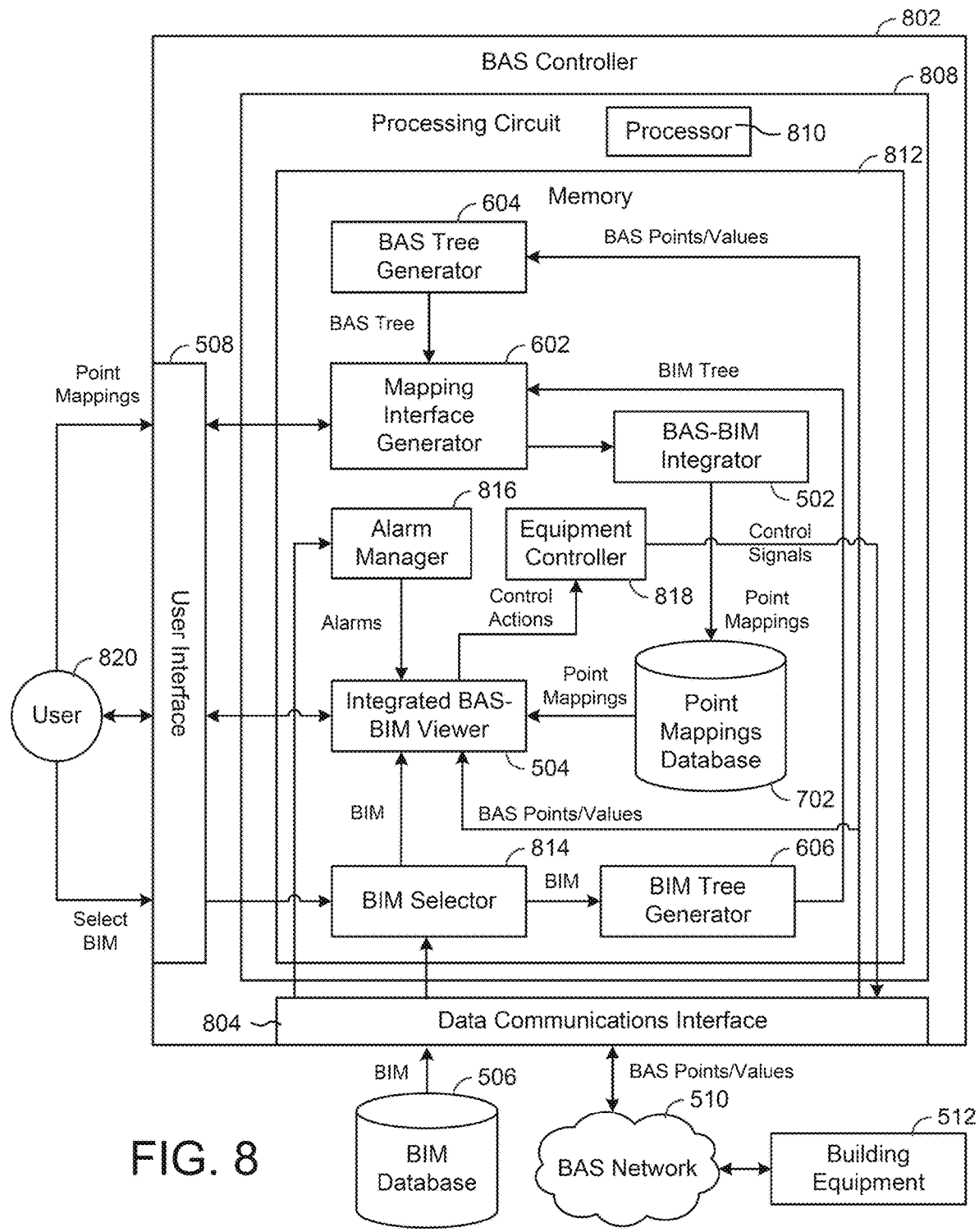
FIG. 8 a block diagram of a BAS controller which may be used to integrate BAS data with a BIM, according to an exemplary embodiment.

Referring now to FIG. 8, a block diagram of a BAS controller 802 is shown, according to an exemplary embodiment. In some embodiments, many of the components of systems 500-700 are components of BAS controller 802. For example, BAS controller 802 is shown to include a BAS-BIM integrator 502, an integrated BAS-BIM viewer 504, a user interface 508, a mapping interface generator 602, a BAS tree generator 604, a BIM tree generator 606, and a point mappings database 702. These components may be the same or similar as previously described with reference to FIGS. 5-7. Controller 802 may also include some or all of the components of BAS controller 366, as described with reference to FIGS. 3-4.

Controller 802 is shown to include a data communications interface 804 and a processing circuit 808. Interface 804 may facilitate communications between BAS controller 802 and external systems or applications (e.g., BIM database 506, BAS network 510, building equipment 512, a user device, etc.). Interface 804 may include wired or wireless communications interfaces (e.g., jacks, antennas, transmitters, receivers, transceivers, wire terminals, etc.) for conducting data communications with BIM database 506, BAS network 510, or other external systems or devices. In various embodiments, communications via interface 804 may be direct (e.g., local wired or wireless communications) or via a communications network (e.g., a WAN, the Internet, a cellular network, etc.). For example, interface 804 may include an Ethernet card and port for sending and receiving data via an Ethernet-based communications link or network. In another example, interface 804 may include a WiFi transceiver for communicating via a wireless communications network, a cellular or mobile phone communications transceiver, or a power line communications interface.

Processing circuit 808 is shown to include a processor 810 and memory 812. Processor 810 may be a general purpose or specific purpose processor, an application specific integrated circuit (ASIC), one or more field programmable gate arrays (FPGAs), a group of processing components, or other suitable processing components. Processor 810 is configured to execute computer code or instructions stored in memory 812 or received from other computer readable media (e.g., CDROM, network storage, a remote server, etc.).

Memory 812 may include one or more devices (e.g., memory units, memory devices, storage devices, etc.) for storing data and/or computer code for completing and/or facilitating the various processes described in the present disclosure. Memory 812 may include random access memory (RAM), read-only memory (ROM), hard drive storage, temporary storage, non-volatile memory, flash memory, optical memory, or any other suitable memory for storing software objects and/or computer instructions. Memory 812 may include database components, object code components, script components, or any other type of information structure for supporting the various activities and information structures described in the present disclosure. Memory 812 may be communicably connected to processor 810 via processing circuit 818 and may include computer code for executing (e.g., by processor 810) one or more processes described herein. When processor 810 executes instructions stored in memory 812, processor 810 generally configures BAS controller 802 (and more particularly processing circuit 808) to complete such activities.

Still referring to FIG. 8, memory 812 is shown to include a BIM selector 814. BIM selector 804 may be configured to receive a selected BIM from user 820. In some embodiments, user 820 uploads the BIM to BAS controller 802. In other embodiments, BIM selector 814 retrieves the BIM from BIM database 606. BIM selector 814 may provide the BIM to BIM tree generator 606 for use in generating the BIM tree. In some embodiments, BIM selector 814 provides the BIM to integrated BAS-BIM viewer 504. In other embodiments, BIM selector 814 provides the BIM tree to BAS-BIM point integrator 502.

BAS tree generator 604 may receive the BAS points from BAS network 810 via data communications interface 804 and may use the BAS points to generate a BAS tree. The BIM tree and the BAS tree may be provided to mapping interface generator 602. Mapping interface generator 602 uses the BAS tree and BIM tree to generate a mapping interface. The mapping interface may be presented to user 820 via user interface 508. The user interacts with the mapping interface to define point mappings. The point mappings may be stored in point mappings database 702 and/or used by BAS-BIM integrator 502 to modify the BIM.

Integrated BAS-BIM viewer 504 may receive the point mappings from point mappings database and may use the point mappings to identify BAS points associated with BIM objects referenced in the BIM. In other embodiments, integrated BAS-BIM viewer 504 receives a BIM with integrated BAS points from BAS-BIM point integrator 502, as described with reference to FIG. 5. Integrated BAS-BIM viewer 504 may retrieve corresponding point values from BAS network 510 via data communications interface 804. Integrated BAS-BIM viewer 504 may then present the BIM with integrated BAS points and values to user 820 via user interface 508.

Still referring to FIG. 8, memory 812 is shown to include an alarm manager 816 and an equipment controller 818. Alarm manager 816 may receive alarms from BAS network 510 or may identify alarms based on the values of the BAS points. For example, alarm manager 816 may compare the values of the BAS points to alarm thresholds. If a BAS point is not within a range of values defined by the alarm thresholds, alarm manager 816 may determine that an alarm condition exists for the BAS point. Alarm manager 816 may provide alarms to integrated BAS-BIM viewer 504. Integrated BAS-BIM viewer 504 may use the alarms to generate part of the user interface provided to user 820.

Equipment controller 818 may receive control actions from integrated BAS-BIM viewer 504. The control actions may be user-defined control actions provided via the integrated BAS-BIM viewing interface. Equipment controller 818 may use the control actions to generate control signals for building equipment 512 or otherwise adjust the operation of building equipment 512. In this way, the BIM with integrated BAS points and values not only allows a user to monitor the BAS, but also provides the control functionality of a graphical BAS management and control interface. Several exemplary graphical interfaces which may be generated by integrated BAS-BIM viewer 504 are described in greater detail with reference to FIGS. 9-18.

User Interfaces

Referring now to FIGS. 9-18, several user interfaces 900-1800 which may be generated by BAS-BIM integrator 502 and integrated BAS-BIM viewer 504 are shown, according to an exemplary embodiment. In some embodiments, interfaces 900-1800 are web interfaces and may be presented via a web browser running on a user device. The user device may be a computer workstation, a client terminal, a personal computer, or any other type of user device. In various embodiments, the user device may be a mobile device (e.g., a smartphone, a tablet, a PDA, a laptop, etc.) or a non-mobile device. In other embodiments, interfaces 900-1800 are presented via a specialized monitoring and control application. The application may run on BAS controller 366, on a computer system within BAS 400, on a server, or on a user device. In some embodiments, the application is a mobile application configured to run on a mobile device.

Figure 9:
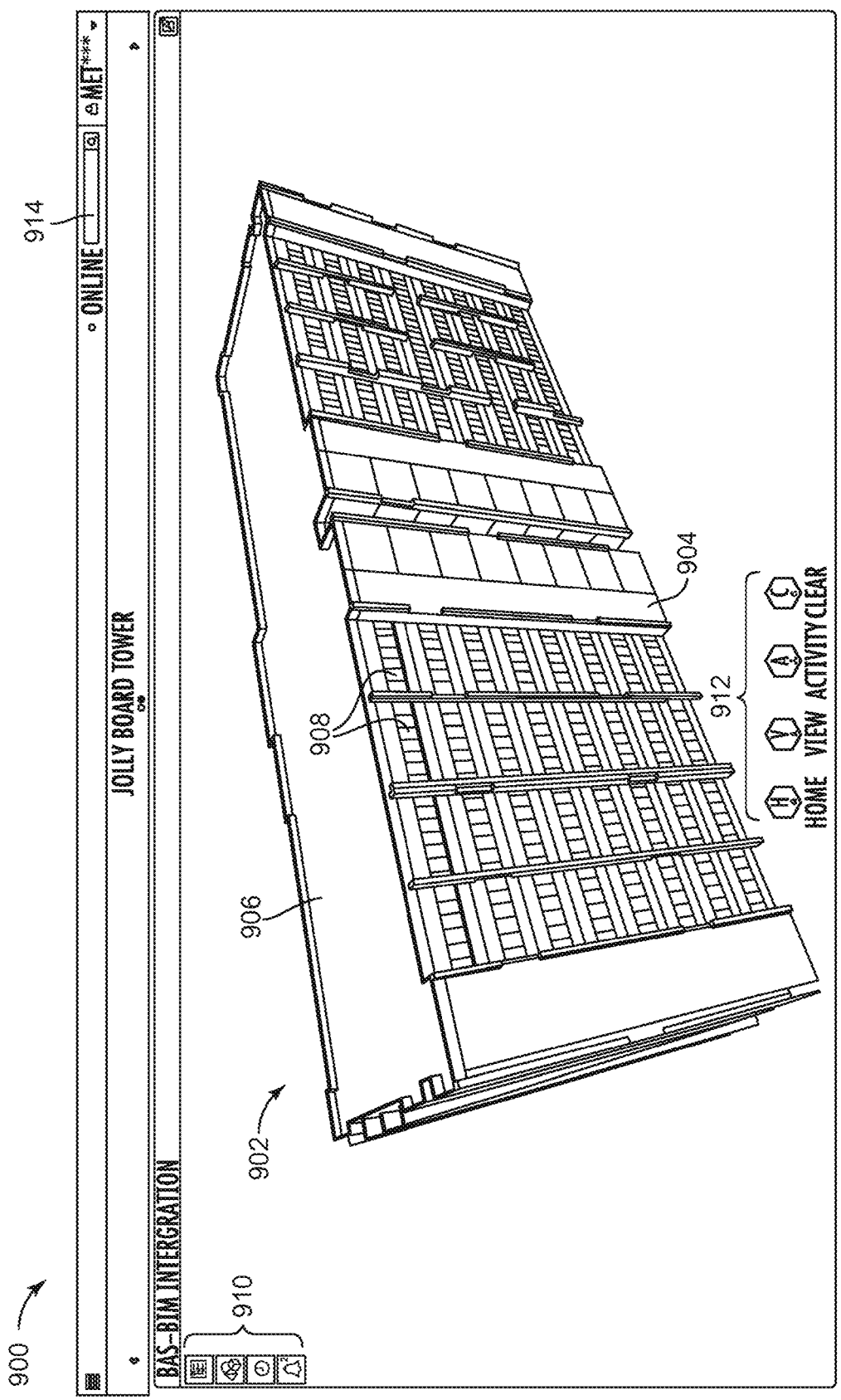
FIGS. 9-18 are drawings of user interfaces which may be generated by the systems of FIGS. 5, 7, and/or 8 illustrating a graphical representation of a BIM with integrated BAS data, according to an exemplary embodiment.

Referring particularly to FIG. 9, an integrated BAS-BIM viewer interface 900 is shown, according to an exemplary embodiment. Interface 900 may be generated by integrated BAS-BIM viewer 504 to view and interact with a BIM with integrated BAS points and values. Interface 900 is shown to include a perspective view of a building 902. Building 902 is shown to include walls 904, a roof 906, and windows 908. The geometry and locations of components 904-906 may be defined by the BIM objects within the BIM model.

Interface 900 may be interactive and may allow a user to view building 902 from multiple different angles and/or perspectives. For example, interface 900 may provide interface options for zooming in, zooming out, panning vertically or horizontally, rotating the view, and/or otherwise changing the perspective. View buttons 912 may be used to select a particular view (e.g., top, side, front, back, left, right, back, perspective, etc.) of building 902. Navigation buttons 910 may be used to display a tree of BIM objects, filter the BIM objects (e.g., by type, by location, etc.), display any alarms provided by the BAS, or otherwise manipulate the view of building 902. Search box 914 can be used to search for particular BIM objects, search for BAS points, search for a particular room or zone, and/or search for building equipment. Selecting an item via navigation buttons 910 or search box 914 may change the view of building 902 based on the user selection (e.g., to view a selected component, to hide components, etc.).

Figure 10:
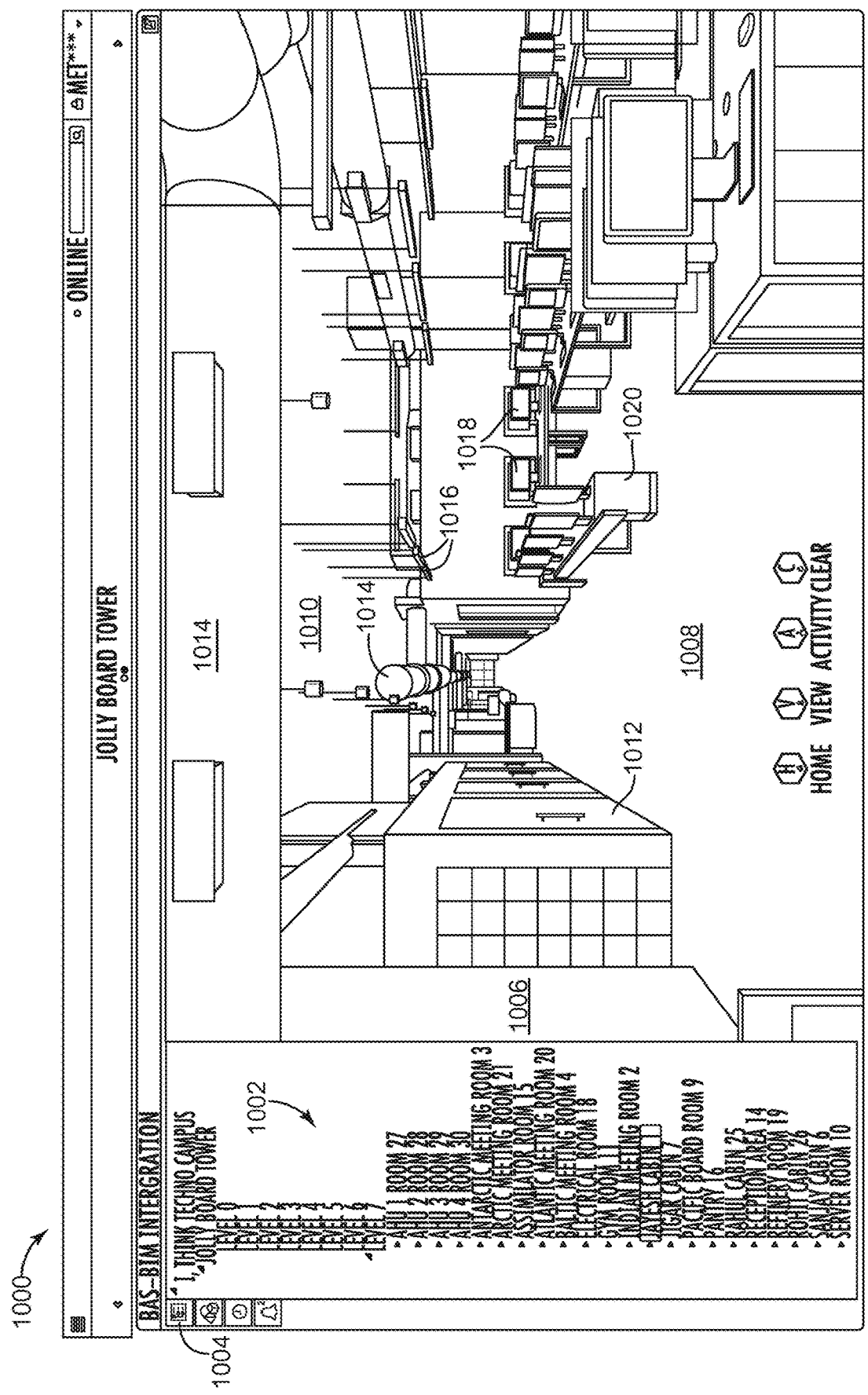

Referring now to FIG. 10, another integrated BAS-BIM viewer interface 1000 is shown, according to an exemplary embodiment. Interface 1000 may be generated by integrated BAS-BIM viewer 504 to view and interact with a BIM with integrated BAS points and values. Interface 1000 shows a view of building 902 from a location within building 902. Interface 1000 is shown to include structural components of building 902 such as walls 1006, floor 1008, ceiling 1010, and doors 1012. Interface 1000 also displays HVAC components 1014 (e.g., air ducts), lighting components 1016 (e.g., lighting fixtures), electronic components 1018 (e.g., computer monitors), and furniture 1020 (e.g., desks). The geometry and locations of components 1006-1020 may be defined by the BIM objects within the BIM model.

Interface 1000 is shown to include an object tree 1002. Object tree 1002 may be displayed in response to selecting tree button 1004. Object tree 1002 includes a hierarchical representation of building 902 and the various spaces and components contained therein. For example, object tree 1002 is shown to include objects representing a campus, a particular building within the campus (e.g., Jolly Board Tower), levels within the building (e.g., level 0, level 1, level 2, etc.), and spaces/components within each level (e.g., conference rooms, offices, AHUs, etc.). Selecting any of the objects displayed in object tree 1002 may cause interface 1000 to display the selected object or change the view to show the selected object.

Figure 11:
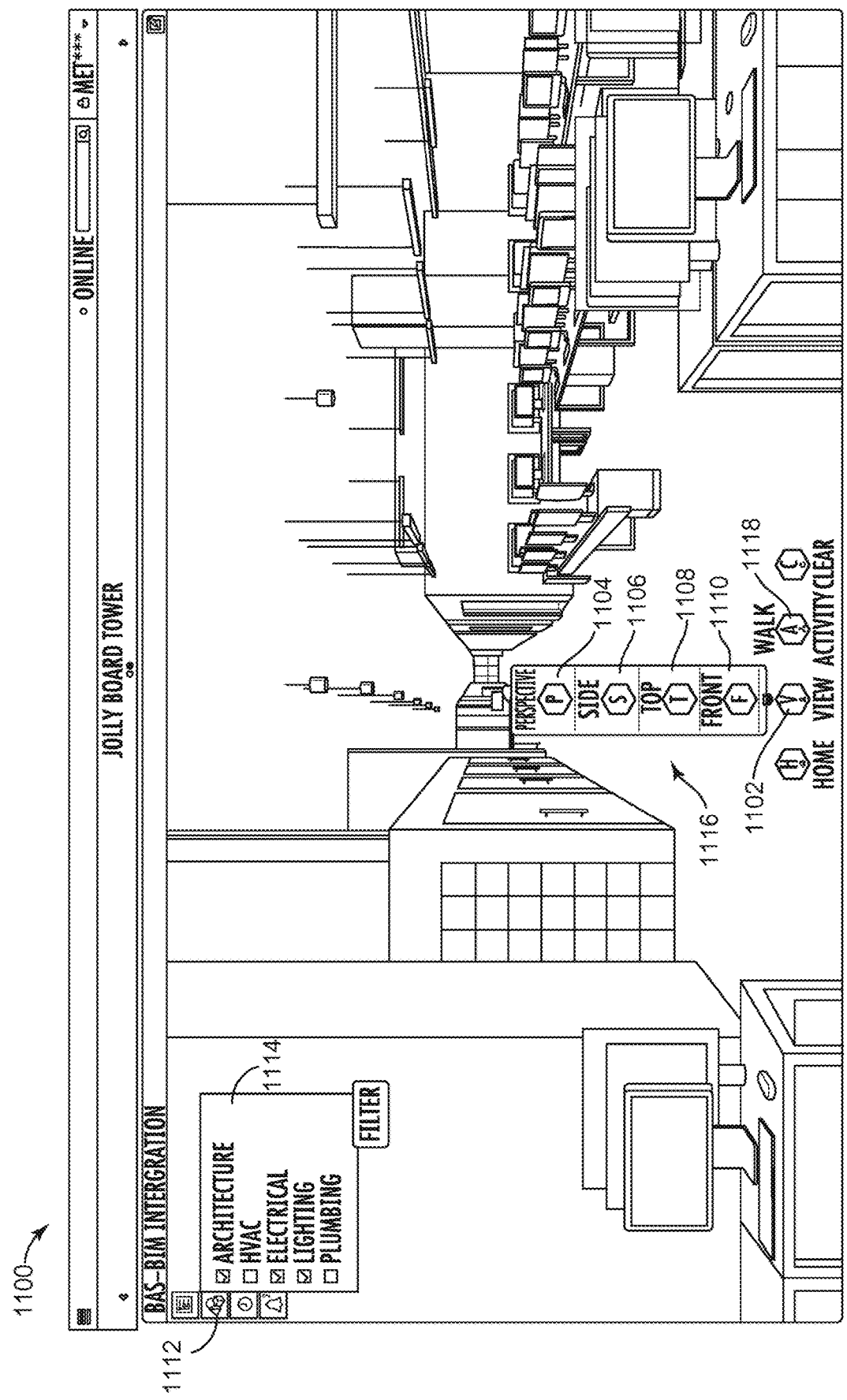

Referring now to FIG. 11, another integrated BAS-BIM viewer interface 1100 is shown, according to an exemplary embodiment. Interface 1100 may be generated by integrated BAS-BIM viewer 504 to view and interact with a BIM with integrated BAS points and values. Interface 1100 is shown to include the same view of building 902 as shown in interface 1000. The view can be changed by selecting view button 1102. For example, selecting view button 1102 may cause view menu 1116 to be displayed. View menu 1116 is shown to include a perspective button 1104, a side button 1106, a top button 1108, and a front button 1110. Selecting any of buttons 1104-1110 may cause the view to change to the selected view. Selecting activity button 1118 may allow a user to change the view to simulate the perspective of a person walking through building 902.

Interface 1110 is shown to include a filter menu 1114. Filter menu 1114 may be displayed in response to selecting filter button 1112. Filter menu 1114 includes several categories of objects which can be selectively filtered by checking or unchecking the boxes associated with each category. For example, filter menu 1114 is shown to include the categories of architecture, HVAC, lighting, and plumbing. As shown in FIG. 11, unchecking the box associated with the HVAC category causes the HVAC components 1014 to be hidden.

Figure 12:
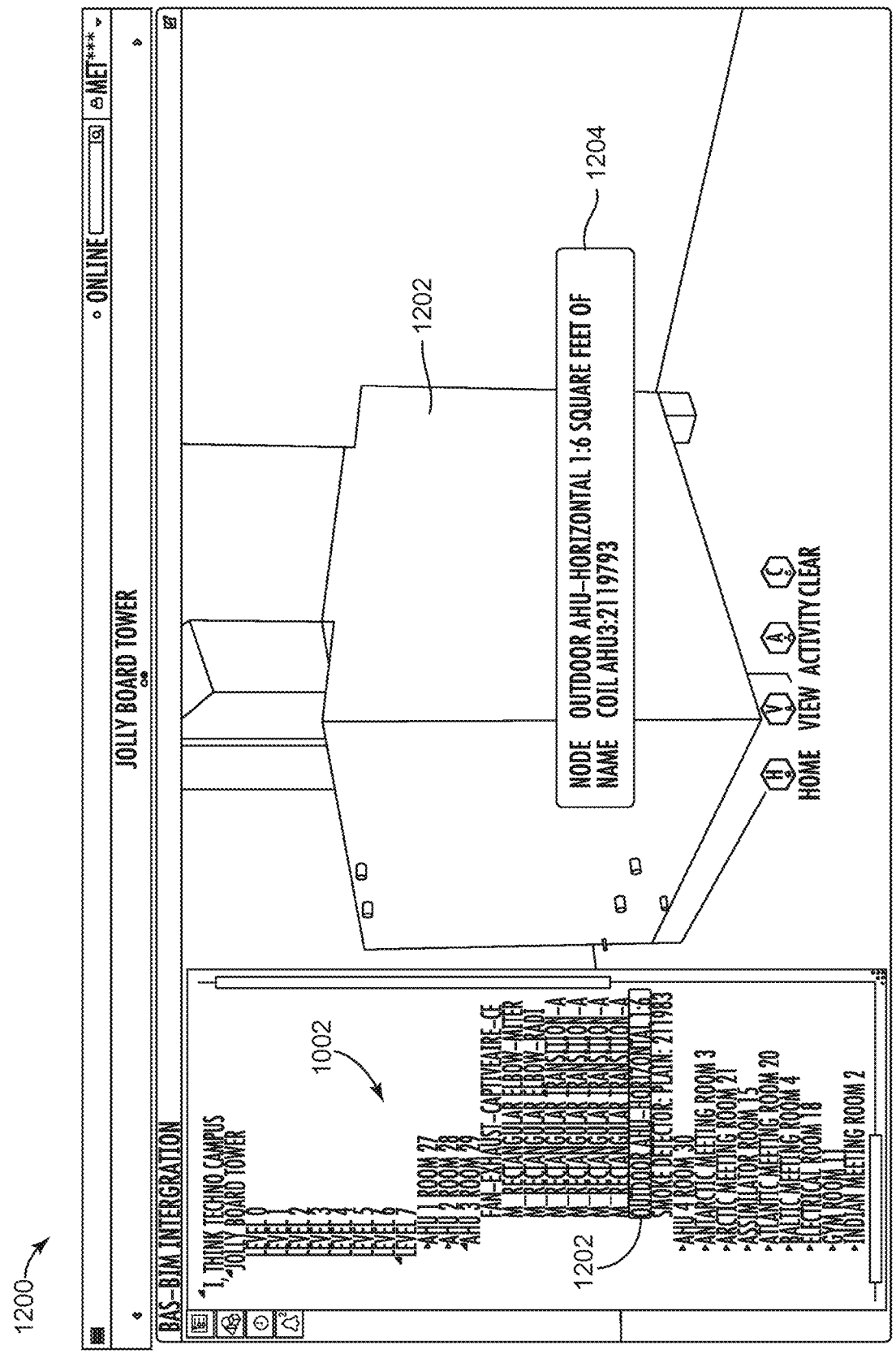

Referring now to FIG. 12, a BIM viewer interface 1200 is shown, according to an exemplary embodiment. Interface 1200 may be generated by integrated BAS-BIM viewer 504 to view and interact with a BIM. Interface 1200 is shown to include a view of an air handling unit (AHU) 1202 within building 902. In some embodiments, the view shown in FIG. 12 is displayed in response to selecting an object associated with AHU 1202 via object tree 1002. For example, the object named "Outdoor AHU—Horizontal 1:6 Square Feet of Coil" can be selected via object tree 1002 to cause AHU 1202 to be displayed.

Interface 1200 shows a view of AHU 1202 before the BAS points are integrated with the BIM. For example, selecting or hovering over AHU 1202 may cause information window 1204 to be displayed. Since no BAS points are yet associated with AHU 1202, information window 1204 displays only the node name of AHU 1202. Once BAS points are integrated with the BIM, information window 1204 may be modified to display any BAS points/values that have been mapped to the BIM object representing AHU 1202.

Figure 13:
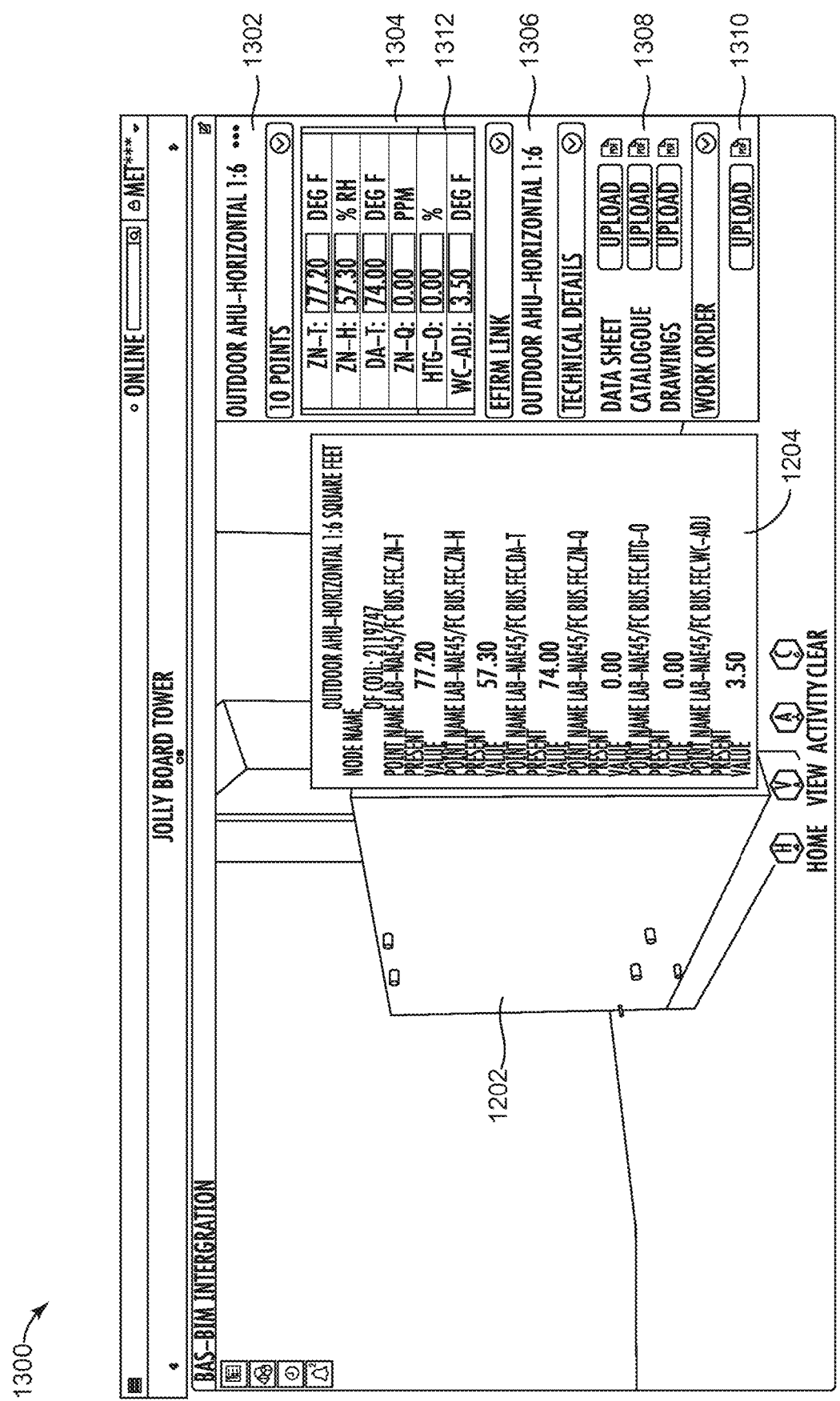

Referring now to FIG. 13, another integrated BAS-BIM viewer interface 1300 is shown, according to an exemplary embodiment. Interface 1300 may be generated by integrated BAS-BIM viewer 504 to view and interact with a BIM with integrated BAS points and values. Interface 1300 shows a view of AHU 1202 after BAS points have been integrated with the BIM. In addition to the information shown in interface 1200, information window 1204 is shown to include several BAS points and the present values associated with each BAS point. The point names may be stored as attributes of the BIM and loaded when the BIM is viewed. The present values may be retrieved from the BAS network and displayed within information window 1204 when AHU 1202 is selected.

Interface 1300 is shown to include a BAS information window 1302. Window 1302 is shown to include several types of information retrieved from the BAS. For example, window 1302 is shown to include BAS points 1304 that have been mapped to AHU 1202, an EFIRM link 1306, technical details about AHU 1202 (e.g., a product data sheet, a catalogue, drawings, etc.), and work order information 1310 describing any work orders that have been performed or scheduled for AHU 1202. Any faults associated with BAS points 1304 or AHU 1202 may be displayed in BAS information window 1302. For example, if the BAS points "HTG-O" and "WC-ADJ" are out of range or otherwise indicate a fault condition, these BAS points may be highlighted in window 1302 (e.g., by coloring portion 1312 red or flashing the BAS points or present values, etc.). Advantageously, interface 1300 allows a user to see not only the BIM information, but also integrated BAS information on a single display.

Figure 14:
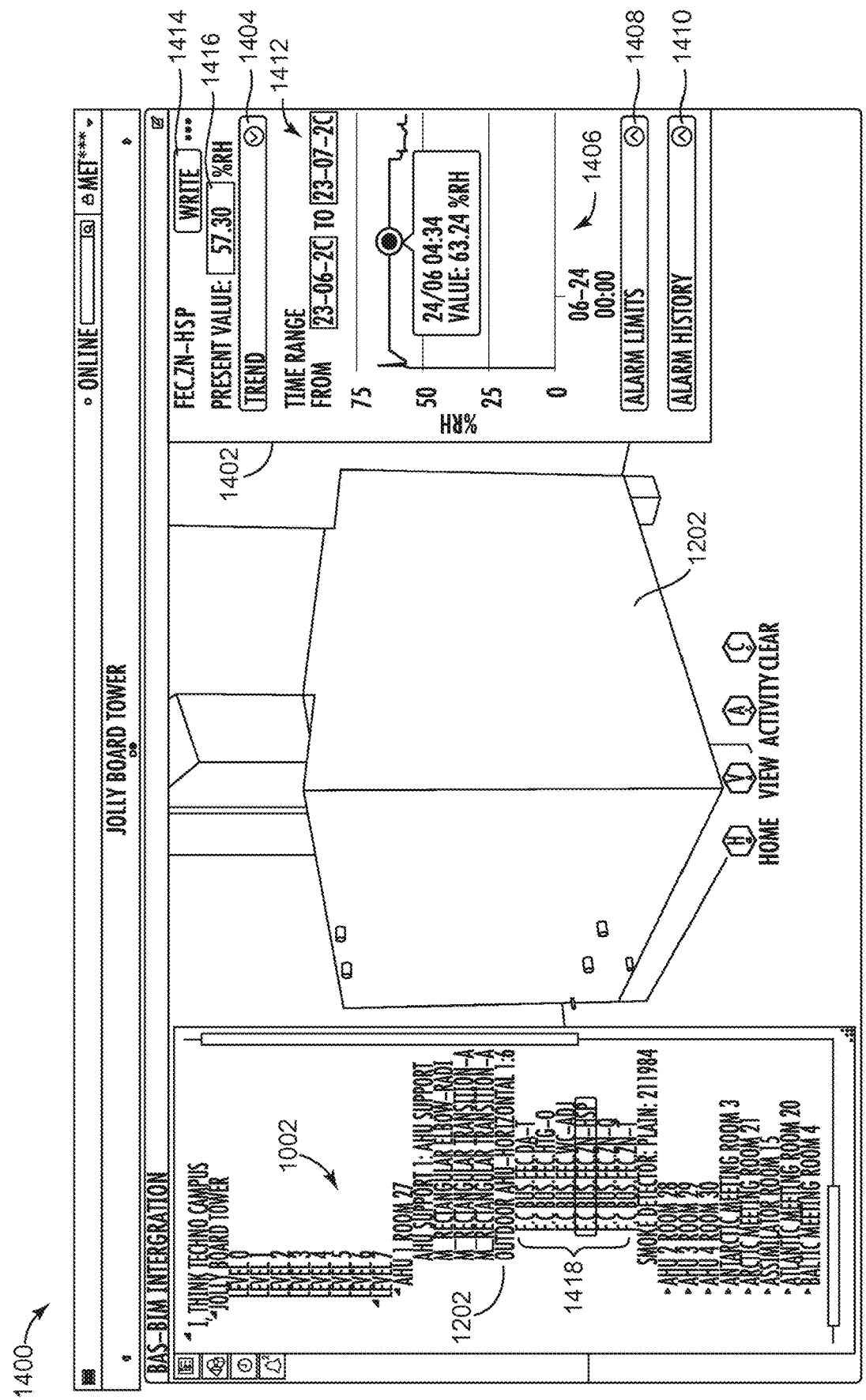

Referring now to FIG. 14, another integrated BAS-BIM viewer interface 1400 is shown, according to an exemplary embodiment. Interface 1400 may be generated by integrated BAS-BIM viewer 504 to view and interact with a BIM with integrated BAS points and values. Interface 1400 is shown to include a plurality of BAS points 1418 associated with AHU 1202 in object tree 1002. BAS points 1418 may include any point from the BAS that has been mapped to the object associated with AHU 1202 (e.g., a humidity measurement, a temperature measurements, a temperature setpoint, etc.).

Interface 1400 is shown to include a point information window 1402. Point information window 1402 may be displayed in response to selecting a BAS point 1408 in object tree 1002. For example, point information window 1402 may be displayed when the BAS point "FEC.ZN-H" is selected in object tree 1002. Point information window 1402 is shown to include a trend data portion 1404. Trend data portion 1404 may include a graph 1406 of past values of the selected BAS point within a user-defined time range. A user can define the time range for which trend data is displayed by entering times via text boxes 1412. Graph 1406 may include a history of past values and can be selected to display the value of the BAS point at any instant in time.

Point information window 1402 may include an alarm limits portion 1408 and an alarm history portion 1410. Alarm limits portion 1408 may allow a user to define alarm limits for the BAS point. If the BAS point does not fall within the alarm limits, the BAS point may be indicated as a fault. Alarm history portion 1410 may allow a user to view a history of alarms associated with the BAS point.

Point information window 1402 may allow a user to write new values for the BAS point. For example, point information window 1402 is shown to include a text box 1416 which can be used to enter a user-defined value for the BAS point. Selecting write button 1414 may send the user-defined value to the BAS. This feature may be useful for adjusting a setpoint or calibrating a BAS point.

Figure 15:
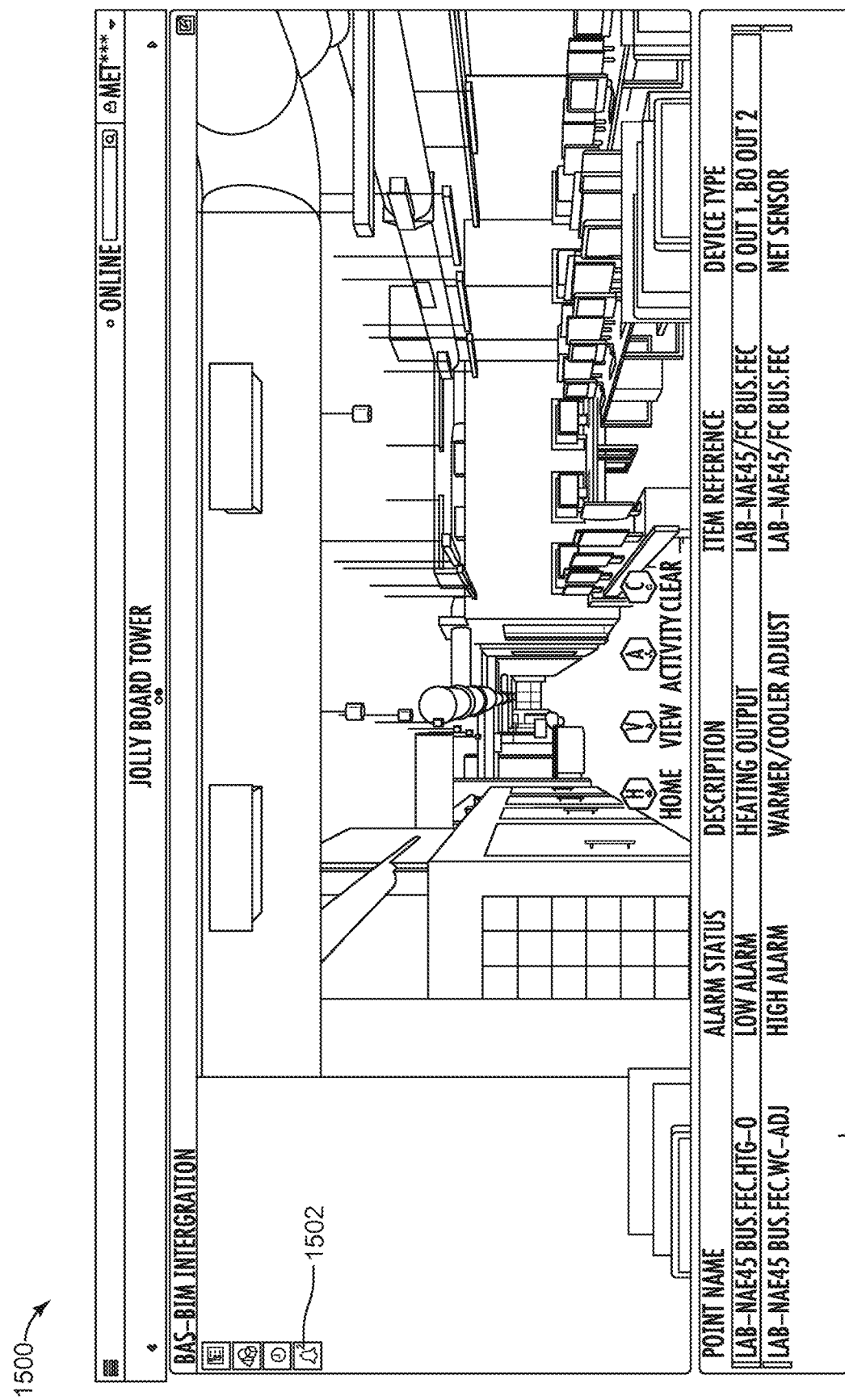

Referring now to FIG. 15, another integrated BAS-BIM viewer interface 1500 is shown, according to an exemplary embodiment. Interface 1500 may be generated by integrated BAS-BIM viewer 504 to view and interact with a BIM with integrated BAS points and values. Interface 1500 is shown to include an alarms summary window 1504. Window 1504 may be displayed in response to selecting alarms button 1502. Alarms summary window 1504 is shown to include an indication of any alarms faults associated with the BAS points. Window 1504 may describe each alarm by identifying BAS point associated with the alarm (e.g., by point name), an alarm status (e.g., high or low), a description of the alarm (e.g., heating output), an item reference associated with the alarm, and a device type for the associated BAS point. In some embodiments, alarms summary window 1504 provides user interface options to perform automated fault diagnostics to detect an underlying fault associated with the alarms or to respond to alarms. Selecting an alarm in alarms summary window 1504 may change the view of the building so that the object associated with the alarm is shown (e.g., navigating to a portion of the building that includes the object, zooming in on the object, etc.). The object associated with the alarm may be highlighted in the view of the building (e.g., colored red, flashing, etc.) so that the user can easily identify the object in the view window.

Figure 16:
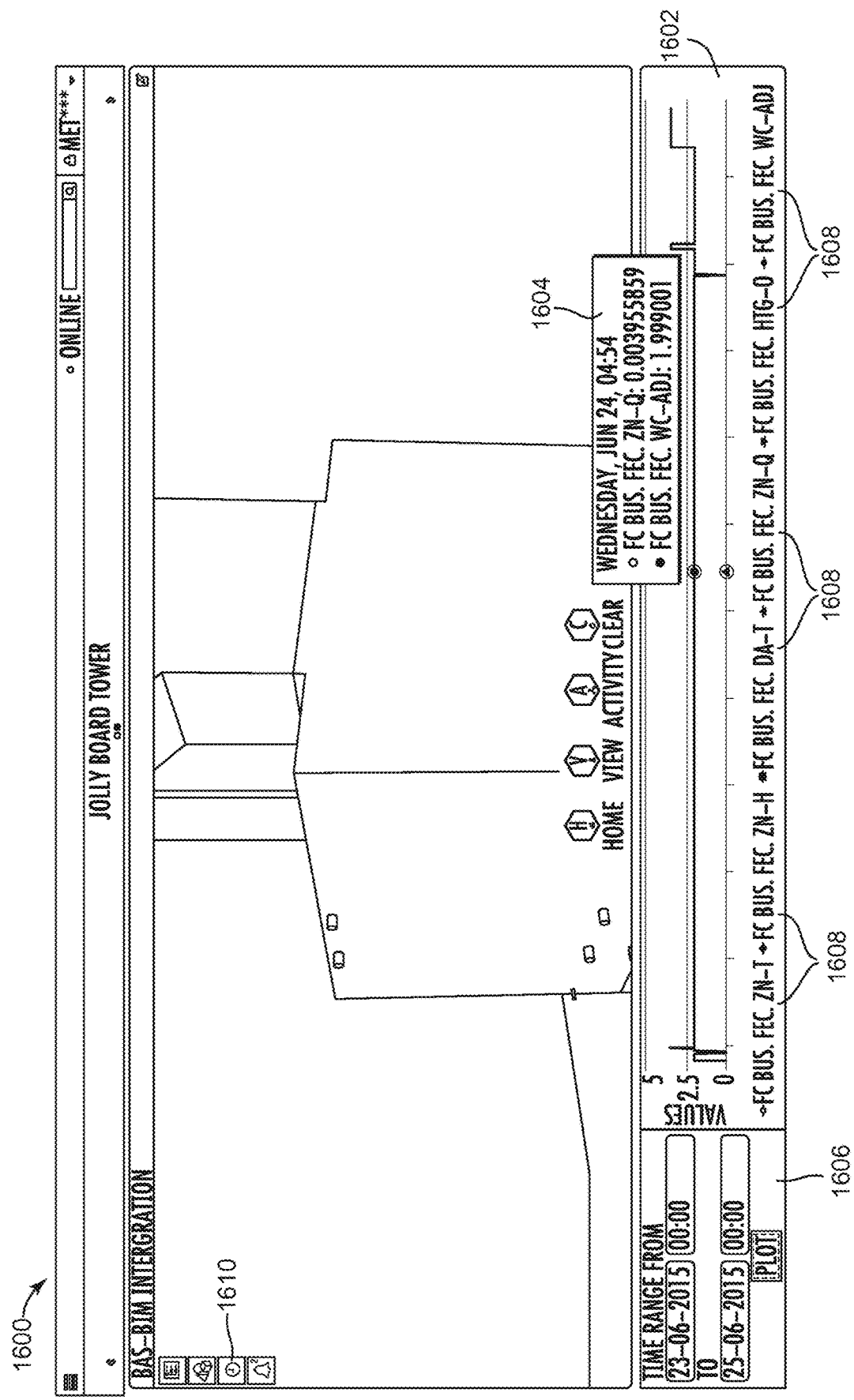

Referring now to FIG. 16, another integrated BAS-BIM viewer interface 1600 is shown, according to an exemplary embodiment. Interface 1600 may be generated by integrated BAS-BIM viewer 504 to view and interact with a BIM with integrated BAS points and values. Interface 1600 is shown to include a trend window 1602, which may be displayed in response to a user selecting trend button 1610. Trend window 1602 may be configured to display trend data for multiple BAS points on the same graph. For example, trend window 1602 is shown displaying trend data for the BAS points "FEC.ZN-Q" and "FEC.WC-ADJ" concurrently on the same graph. Advantageously, trend window 1602 may display trend data (e.g., time series data) for all of the BAS points mapped to a particular BIM object in a single display without requiring any additional user input or configuration to identify the BAS points. BAS points can be displayed or removed from the graph by selecting or deselecting point labels 1608. In some embodiments, interface 1600 includes a time range selector 1606 which allows a user to define the start time and the end time for the trend data displayed in trend window 1602. In some embodiments, interface 1600 includes a value display box 1604 which displays values for one or more of the BAS points shown in the graph at a particular instant in time. A user can select or hover over a portion of the graph to specify the instant in time for which the data values are displayed.

Figure 17:
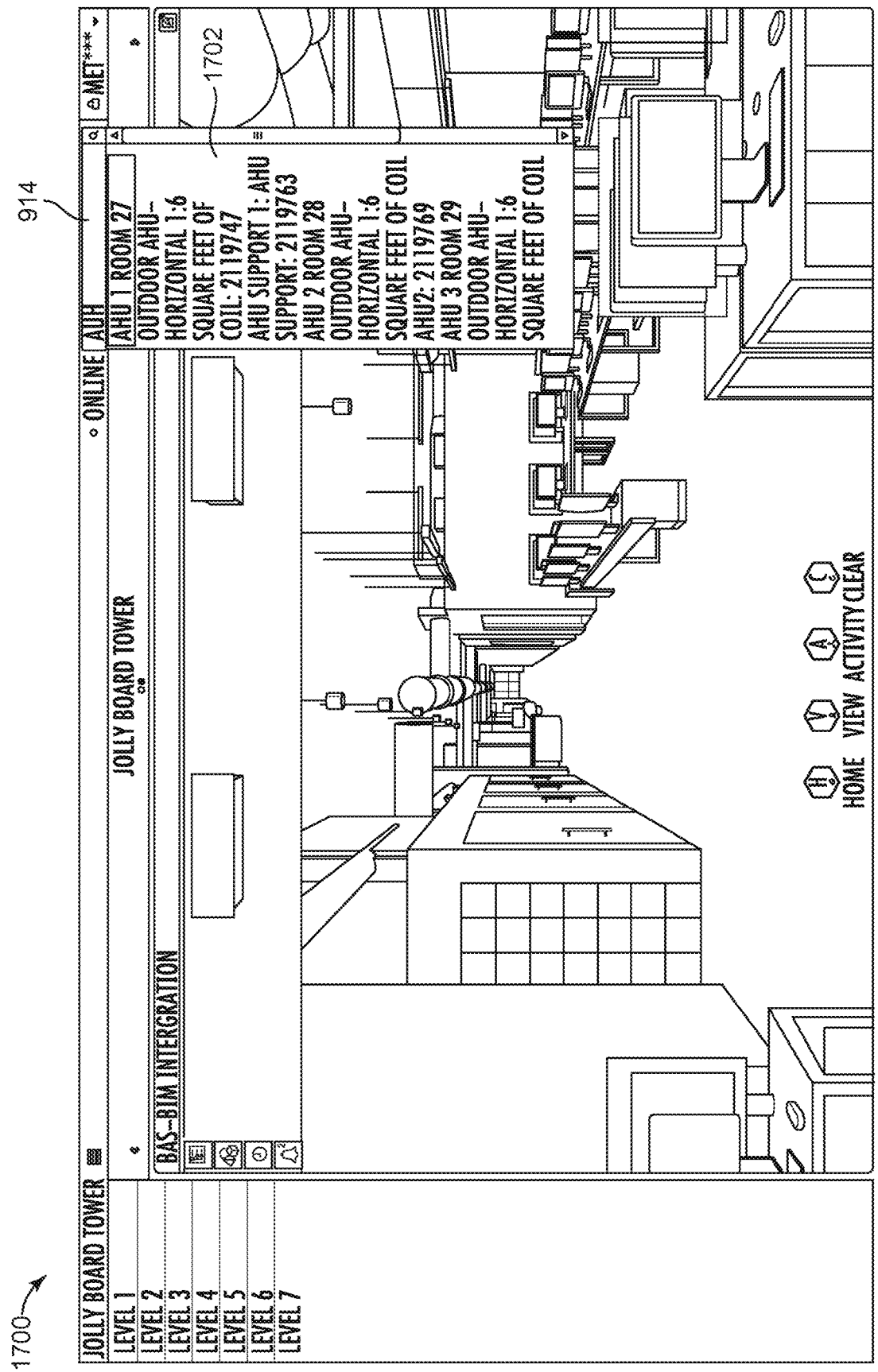

Referring now to FIG. 17, another integrated BAS-BIM viewer interface 1700 is shown, according to an exemplary embodiment. Interface 1700 may be generated by integrated BAS-BIM viewer 504 to view and interact with a BIM with integrated BAS points and values. Interface 1700 is shown to include a search box 914. Search box 914 can be used to search for particular BIM objects, BAS points, particular rooms or zones, building equipment, or other objects or data points that match a user-defined search term. Interface 1700 may be configured to search BAS point names, BIM object names, BIM object attributes, or other items included in the integrated BIM model. Results of the search may be displayed in search results list 1702. Selecting an item in search results list 1702 may change the view of building 902 based on the user selection (e.g., to view a selected object or an object associated with a selected BAS point).

Referring now to FIG. 18, a point mapping interface 1800 is shown, according to an exemplary embodiment. Interface 1800 may be generated by integrated BAS-BIM integrator 502 to map BAS points to BIM objects. Interface 1800 may allow a user to identify a BIM or upload a BIM (e.g., by selecting upload button 1806). The uploaded BIM may be used to generate a BIM tree 1804, which may include a hierarchical listing of BIM objects. Interface 1800 may automatically identify a corresponding BAS and retrieve a BAS tree 1802 from the BAS network. Interface 1800 may allow a user to rename the identified BAS and/or identify a different BAS (e.g., by entering a campus name 1808, building name 1810, etc.). The identified BAS may be used to generate a BAS tree 1802, which may include a hierarchical listing of BAS points. A user can define a mapping between BAS points and BIM objects by dragging and dropping BAS points from BAS tree 1802 onto BIM objects in BIM tree 1804. In some embodiments, the point mappings are stored in a point mappings database. In other embodiments, the mapped BAS points are stored as attributes or properties of the BIM object to which the BAS points are mapped.

Changes to the building or point mappings can be made by uploading a new BIM. For example, if a BAS device is moved from one room in the building to another room in the building, an updated BIM reflecting the change can be uploaded via point mapping interface 1800. Point mapping interface 1800 may be configured to retrieve a previous point mapping from the point mappings database and automatically apply the point mappings to the updated BIM (e.g., by selecting "keep record" button 1812). Advantageously, this feature allows the point mappings to be updated and applied to new versions of the BIM without requiring a user to redefine the point mappings.

BAS-BIM Integration Process

Figure 19:
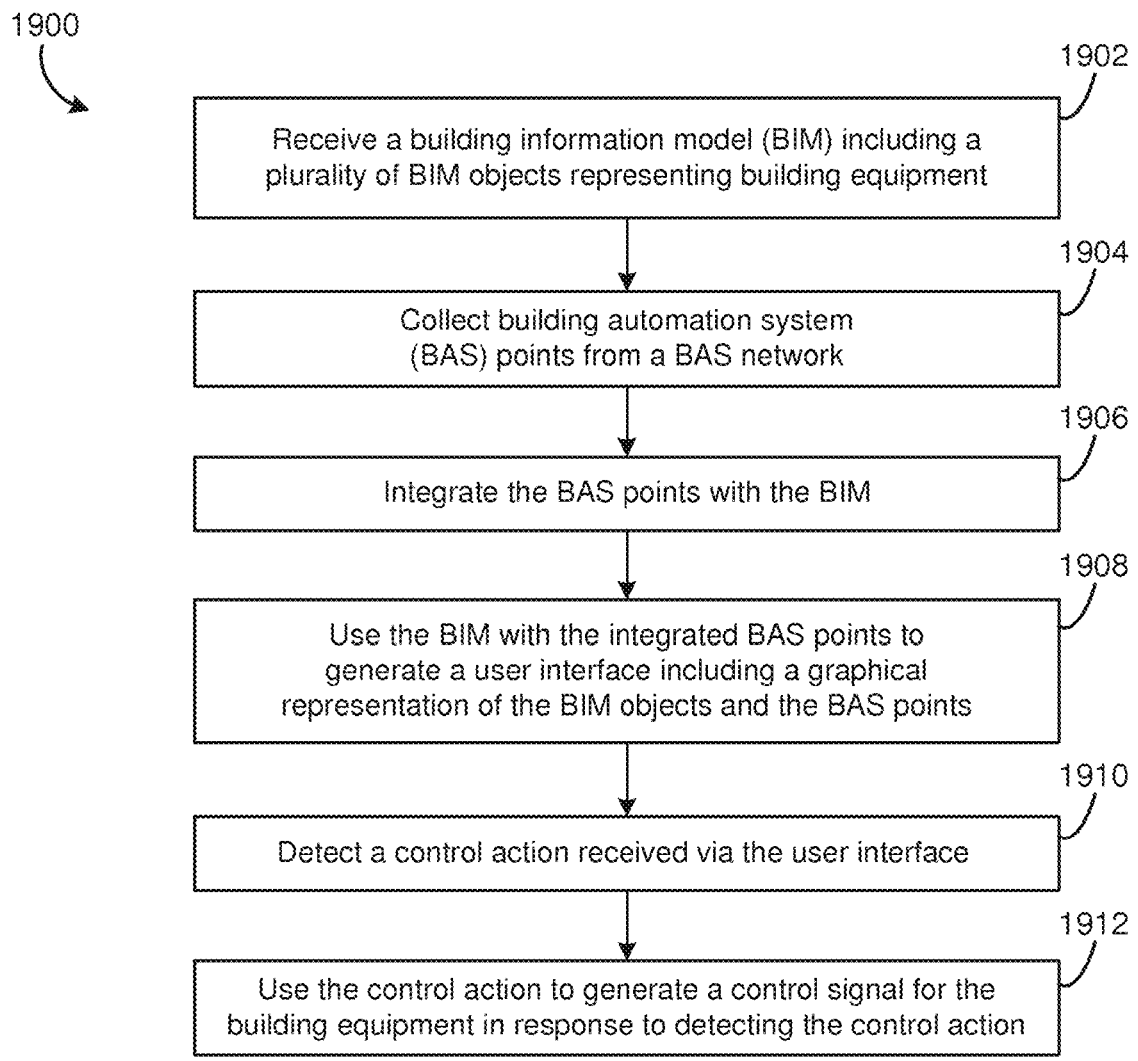
FIG. 19 is a flowchart of a process for integrating BAS data with a BIM, according to an exemplary embodiment.

Referring now to FIG. 19, a flowchart of a process 1900 for generating and using a BIM with integrated BAS points is shown, according to an exemplary embodiment. Process 1900 may be performed by one or more components of system 500, system 700, or controller 800, as described with reference to FIGS. 5-8.

Process 1900 is shown to include receiving a building information model (BIM) (step 1902). The BIM may include a plurality of BIM objects representing building equipment. In some embodiments, the BIM includes a three-dimensional model of the building. The BIM objects may include one or more objects representing structural components of the building and one or more objects representing spaces within the building.

Process 1900 is shown to include collecting building automation system (BAS) points from a BAS network (step 1904). The BAS network may include a BACnet network, a LonWorks network, or any other network configured to facilitate communications between building equipment. The BAS points may be measured data points, calculated data points, setpoints, or other types of data points used by the BAS, generated by the BAS, or stored within the BAS (e.g., configuration settings, control parameters, equipment information, alarm information, etc.). In some embodiments, step 1904 includes retrieving corresponding point values from the BAS network. The point values may include at least one of values measured by the building equipment, values generated by the building equipment, setpoints for the building equipment, and operating parameters for the building equipment.

Process 1900 is shown to include integrating the BAS points with the BIM (step 1906). In some embodiments, step 1906 includes generating a BAS tree that includes the BAS points, generating a BIM tree that includes the BIM objects, and generating a mapping interface that includes the BAS tree and the BIM tree. Step 1906 may include establishing mappings between the BAS points and the BIM objects based on a user input received via the mapping interface. For example, the user input may include dragging and dropping the BAS points from the BAS tree onto BIM objects in the BIM tree. In some embodiments, step 1906 includes storing mappings between the BAS points and the BIM objects in a mappings database.

Process 1900 is shown to include using the BIM with the integrated BAS points to generate a user interface including a graphical representation of the BIM objects and the BAS points (step 1908). Several examples of user interfaces that may be generated in step 1908 are described with reference to FIGS. 9-18. The user interface may be viewed using an integrated BAS-BIM viewer (e.g., CAD software, a CAD viewer, a web browser, etc.). The BAS-BIM viewer uses the geometric and location information from the BIM to generate 3D representations of physical components and building spaces. Advantageously, a user can view real-time data from the BAS and/or trend data for objects represented in the BIM simply by viewing the BIM with integrated BAS data.

Process 1900 is shown to include detecting a control action received via the user interface (step 1910) and using the control action to generate a control signal for the building equipment (step 1912). In some embodiments, the user interface is an interactive interface that allows the user to view BAS points, change the values of BAS points (e.g., setpoints), configure the BAS, and/or interact with the BAS via the user interface. For example, the user can write new values for any of the BAS points displayed in the BIM (e.g., setpoints), send operating commands or control signals to the building equipment displayed in the BIM, or otherwise interact with the BAS via the BIM.

Control actions submitted via the user interface may be provided to the BAS network. The BAS network may use the control actions to generate control signals for the building equipment or otherwise adjust the operation of the building equipment. In this way, the BIM with integrated BAS points and values not only allows a user to monitor the BAS, but also provides the control functionality of a graphical BAS management and control interface. These features allow the BIM with integrated BAS data to be used as a building control interface which provides a graphical 3D representation of the building and the equipment contained therein without requiring a user to manually create or define graphics for various building components.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the present invention and is not admitted to be prior art by inclusion in the background section.

What is claimed is:

1. A building system of a building comprising one or more storage devices having instructions stored thereon that, when executed by one or more processors, cause the one or more processors to:
   store a plurality of building information model (BIM) objects in one or more databases, wherein at least some of the plurality of BIM objects represent building equipment, the building equipment located within the building and the one or more databases comprising a plurality of collections of attributes for at least some of the plurality of BIM objects that define properties of the building equipment;
   receive a plurality of building automation system (BAS) points associated with the building equipment;
   update the one or more databases by using the plurality of BAS points to store at least one further attribute including a point identifier of a BAS point of the plurality of BAS points that corresponds with a BIM object of the plurality of BIM objects within a collection of attributes for the BIM object;
   generate a three dimensional building interface based on the one or more databases, wherein the three dimensional building interface comprises three dimensional indications of the at least some of the plurality of BIM objects;
   cause a user device to display the three dimensional building interface;
   communicate with a piece of building equipment in the building, the piece of building equipment controlling an environmental condition of the building and receive values of one or more BAS points associated with the piece of building equipment controlling the environmental condition of the building;
   receive, from the three dimensional building interface, an interaction with a particular three dimensional indication of the piece of building equipment in the building; and
   cause the three dimensional building interface to display the values of the one or more BAS points, based on the interaction.

2. The building system of claim 1, wherein the one or more databases include:
   one or more first BIM objects representing structural components of the building; and
   one or more second BIM objects representing spaces within the building.

3. The building system of claim 1, wherein building subsystems of the building equipment include at least one of:
   a heating, ventilation, and air conditioning (HVAC) subsystem;
   an electrical subsystem;
   a lighting subsystem; or
   a plumbing subsystem;
   wherein the BAS points comprise at least one of measured points, calculated points, configuration points, control points, equipment information points, or alarm points.

4. The building system of claim 1, wherein the three dimensional building interface includes:
   the particular three dimensional indication of the piece of building equipment and an indication of a first value of an operating setting of the piece of building equipment;
   wherein the instructions cause the one or more processors to:
   receive, from the user device, a particular interaction with the first value of the operating setting, the particular interaction changing the first value of the operating setting to a second value; and
   communicate with the piece of building equipment causing the piece of building equipment to control the environmental condition of the building based on the second value of the operating setting.

5. The building system of claim 1, wherein the instructions cause the one or more processors to:
   collect a history of work orders for the piece of building equipment, the history of work orders including a plurality of work orders for the piece of building equipment; and
   cause the three dimensional building interface to include a list including the history of work orders for the piece of building equipment in the three dimensional building interface.

6. The building system of claim 1, wherein the instructions cause the one or more processors to:
  generate, based on the plurality of BAS points integrated within the one or more databases for at least some of the plurality of BIM objects, an alarm for the piece of building equipment based on one or more values of a point of the plurality of BAS points mapped to the piece of building equipment;
  generate a work order for the piece of building equipment based on the alarm; and
  cause the three dimensional building interface to include a representation of the work order for the piece of building equipment within the three dimensional building interface.

7. The building system of claim 1, the three dimensional building interface comprising:
  a filtering element for filtering a plurality of building subsystem types;
  wherein the filtering element identifies the plurality of building subsystem types and includes a plurality of interactable elements for the plurality of building subsystem types, the plurality of interactable elements providing independent control to display and to hide the plurality of building subsystem types in the three dimensional building interface;
  wherein interacting with an interactable element of the plurality of interactable elements displays or hides one building subsystem type separate from displaying and hiding other building subsystem types of the plurality of building subsystem types in the three dimensional building interface.

8. The building system of claim 7, wherein the one or more storage devices comprise a plurality of sets of BIM objects, wherein each set of BIM objects of the plurality of sets of BIM objects represents physical components of one of the plurality of building subsystem types;
  wherein the instructions cause the one or more processors to generate the three dimensional building interface based on the one or more databases of the building by causing the three dimensional building interface to include an indication of at least some BIM objects of the plurality of sets of BIM objects.

9. The building system of claim 7, wherein the instructions cause the one or more processors to:
  receive an update trigger; and
  update the three dimensional building interface in response to a reception of the update trigger.

10. The building system of claim 9, wherein the filtering element comprises a filter command button;
  wherein the instructions cause the one or more processors to generate the update trigger in response to receiving, from the user device, a particular interaction with the filter command button.

11. The building system of claim 7, wherein the filtering element is a subsystem filtering element for filtering by the plurality of building subsystem types;
  wherein the instructions cause the one or more processors to:
    receive, from the user device, a particular interaction with the filtering element to display a particular building subsystem;
    update, based on the particular interaction, the three dimensional building interface to include the particular building subsystem.

12. The building system of claim 11, wherein the particular building subsystem is associated with a particular set of BIM objects of the plurality of BIM objects;
  wherein the instructions cause the one or more processors to update, based on the particular interaction, the three dimensional building interface to include the particular building subsystem or to hide the particular building subsystem by causing the three dimensional building interface to include indications of the particular set of BIM objects or hide the indications of the particular set of BIM objects.

13. A method comprising:
  storing, by one or more processing circuits, a plurality of building information model (BIM) objects in one or more databases, wherein at least some of the plurality of BIM objects represent building equipment, the building equipment located within a building and the one or more databases comprising a plurality of collections of attributes for at least some of the plurality of BIM objects that define properties of the building equipment;
  receiving, by the one or more processing circuits, a plurality of building automation system (BAS) points associated with the building equipment;
  updating, by the one or more processing circuits, the one or more databases by using the plurality of BAS points to store at least one further attribute including a point identifier of a BAS point of the plurality of BAS points that corresponds with a BIM object of the plurality of BIM objects within a collection of attributes for the BIM object;
  generating, by the one or more processing circuits, a three dimensional building interface based on the one or more databases, wherein the three dimensional building interface comprises three dimensional indications of the at least some of the plurality of BIM objects;
  causing, by the one or more processing circuits, a user device to display the three dimensional building interface;
  communicating, by the one or more processing circuits, with a piece of building equipment in the building, the piece of building equipment controlling an environmental condition of the building and receiving, by the one or more processing circuits, values of one or more BAS points associated with the piece of building equipment controlling the environmental condition of the building;
  receiving, by the one or more processing circuits, from the three dimensional building interface, an interaction with a particular three dimensional indication of the piece of building equipment in the building; and
  causing, by the one or more processing circuits, the three dimensional building interface to display the values of the one or more BAS points, based on the interaction.

14. The method of claim 13, wherein the three dimensional building interface includes:
  the particular three dimensional indication of the piece of building equipment and an indication of a first value of an operating setting of the piece of building equipment;
  the method comprising:
    receiving, by the one or more processing circuits, from the user device, a particular interaction with the first value of the operating setting, the particular interaction changing the first value of the operating setting to a second value; and
    communicating, by the one or more processing circuits, with the piece of building equipment causing the piece of building equipment to control the environmental condition of the building based on the second value of the operating setting.

15. The method of claim 13, comprising:
collecting, by the one or more processing circuits, a history of work orders for the piece of building equipment, the history of work orders including a plurality of work orders for the piece of building equipment; and
causing, by the one or more processing circuits, the three dimensional building interface to include a list including the history of work orders for the piece of building equipment in the three dimensional building interface.

16. The method of claim 13, further comprising:
generating, by the one or more processing circuits, based on the plurality of BAS points integrated within the one or more databases for at least some of the plurality of BIM objects, an alarm for the piece of building equipment based on one or more values of a point of the plurality of BAS points mapped to the piece of building equipment;
generating, by the one or more processing circuits, a work order for the piece of building equipment based on the alarm; and
causing, by the one or more processing circuits, the three dimensional building interface to include a representation of the work order for the piece of building equipment within the three dimensional building interface.

17. The method of claim 13, the three dimensional building interface comprising:
a filtering element for filtering a plurality of building subsystem types;
wherein the filtering element identifies the plurality of building subsystem types and includes a plurality of interactable elements for the plurality of building subsystem types, the plurality of interactable elements providing independent control to display and to hide the plurality of building subsystem types in the three dimensional building interface;
wherein interacting with an interactable element of the plurality of interactable elements displays or hides one building subsystem type separate from displaying and hiding other building subsystem types of the plurality of building subsystem types in the three dimensional building interface.

18. The method of claim 17, wherein the one or more databases store a plurality of sets of BIM objects, wherein each set of BIM objects of the plurality of sets of BIM objects represents physical components of one of the plurality of building subsystem types;
the method comprising:
generating, by the one or more processing circuits, the three dimensional building interface based on the one or more databases of the building by causing the three dimensional building interface to include an indication of at least some BIM objects of the plurality of sets of BIM objects.

19. One or more non-transitory computer readable media having instructions stored thereon that, when executed by one or more processors, cause the one or more processors to:
store a plurality of building information model (BIM) objects in one or more databases, wherein at least some of the plurality of BIM objects represent building equipment, the building equipment located within a building and the one or more databases comprising a plurality of collections of attributes for at least some of the plurality of BIM objects that define properties of the building equipment;
receive a plurality of building automation system (BAS) points associated with the building equipment;
update the one or more databases by using the plurality of BAS points to store at least one further attribute including a point identifier of a BAS point of the plurality of BAS points that corresponds with a BIM object of the plurality of BIM objects within a collection of attributes for the BIM object;
generate a three dimensional building interface based on the one or more databases, wherein the three dimensional building interface comprises three dimensional indications of the at least some of the plurality of BIM objects;
cause a user device to display the three dimensional building interface;
communicate with a piece of building equipment in the building, the piece of building equipment controlling an environmental condition of the building and receive values of one or more BAS points associated with the piece of building equipment controlling the environmental condition of the building;
receive, from the three dimensional building interface, an interaction with a particular three dimensional indication of the piece of building equipment in the building; and
cause the three dimensional building interface to display the values of the one or more BAS points, based on the interaction.

20. The one or more non-transitory computer readable media of claim 19, the three dimensional building interface comprising:
a filtering element for filtering a plurality of building subsystem types;
wherein the filtering element identifies the plurality of building subsystem types and includes a plurality of interactable elements for the plurality of building subsystem types, the plurality of interactable elements providing independent control to display and to hide the plurality of building subsystem types in the three dimensional building interface;
wherein interacting with an interactable element of the plurality of interactable elements displays or hides one building subsystem type separate from displaying and hiding other building subsystem types of the plurality of building subsystem types in the three dimensional building interface.

* * * * *